(12) United States Patent
Hayashi et al.

(10) Patent No.: US 7,003,326 B2
(45) Date of Patent: Feb. 21, 2006

(54) WIRELESS COMMUNICATION METHOD, BASE STATION, AND RECEIVING TERMINAL

(75) Inventors: Takahiro Hayashi, Yokosuka (JP); Yoshihiro Ishikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 440 days.

(21) Appl. No.: 10/441,007

(22) Filed: May 20, 2003

(65) Prior Publication Data

US 2003/0220127 A1    Nov. 27, 2003

(30) Foreign Application Priority Data

May 23, 2002   (JP)  ............................. 2002-149417

(51) Int. Cl.
   *H04M 1/00*   (2006.01)

(52) U.S. Cl. ................ 455/562.1; 455/561; 455/452.1; 455/447; 370/329; 370/334; 342/368

(58) Field of Classification Search ............. 455/562.1, 455/561, 429, 450–453, 446–448; 370/328, 370/329, 334, 338; 342/368, 367
See application file for complete search history.

(56) References Cited

U.S. PATENT DOCUMENTS

| 5,566,355 | A | * | 10/1996 | Kanai .......................... 445/25 |
| 6,141,335 | A | | 10/2000 | Kuwahara et al. |
| 6,161,023 | A | | 12/2000 | Johnson et al. |
| 6,233,466 | B1 | * | 5/2001 | Wong et al. ............. 455/562.1 |

FOREIGN PATENT DOCUMENTS

| CN | 1189068 A | 7/1998 |
| WO | WO 99/33302 | 7/1999 |

* cited by examiner

*Primary Examiner*—Lester G. Kincaid
*Assistant Examiner*—Marcos L Torres
(74) *Attorney, Agent, or Firm*—Oblon, Spivak, McClelland, Maier & Neustadt, P.C.

(57) ABSTRACT

A wireless communication method includes the steps of: calculating a transmission block number-related condition necessary for enabling a receiving terminal to receive all the blocks of broadcast control channel information based on the total number of the blocks and a transmission block number; calculating a rotation angular velocity-related condition based on the foregoing condition, a block unit time, and a coverage angle; and controlling a first directional antenna to rotate a beam at a rotation angular velocity decided based on the condition relating to the rotation angular velocity of the beam.

7 Claims, 12 Drawing Sheets

FIG.3

| 0 | 1 | 2 | 3 |
|---|---|---|---|
| 4 | 5 | 6 | 7 |
| 8 | 9 | 10 | 11 |
| 12 | 13 | 14 | 15 |
| 16 | 17 | 18 | 19 |

| 56 | 57 | 58 | 59 |
|---|---|---|---|
| 60 | 61 | 62 | 63 |

COMPLETION FLAG "OFF"

WIRELESS COMMUNICATION METHOD, BASE STATION, AND RECEIVING TERMINAL

CROSS REFERENCE TO RELATED APPLICATIONS

This application is based upon and claims the benefit of priority from the prior Japanese Patent Applications No. P2002-149417, filed on May 23, 2002; the entire contents of which are incorporated herein by reference.

BACKGROUND OF THE INVENTION

1. Field of the Invention

The present invention relates to a wireless communication method for transmitting broadcast control channel information by the rotation of a beam from a directional antenna of a base station, a base station, and a receiving terminal.

2. Description of the Related Art

In wireless communication systems, as a kind of control channel, broadcast control channels (perch channels) are generally provided. Base stations transmit information necessary for communications to receiving terminals (e.g., mobile terminals) using the broadcast control channels. Information transmitted to receiving terminals using broadcast control channels (information necessary for communications) is hereinafter referred to as broadcast control channel information.

First, a user turns on a receiving terminal. Then, the receiving terminal searches for a near base station, and receives the broadcast control channel information transmitted from the found base station. The receiving terminal obtains the broadcast control channel information. The receiving terminal transmits to the base station a signal indicating information which identifies the receiving terminal. The receiving terminal waits in such a state where it can receive a signal transmitted from the base station. Consequently, the receiving terminal can perform data communications with the base station.

Accordingly, the receiving terminal needs to be capable of receiving the broadcast control channel information transmitted by the base station wherever the receiving terminal is within the area covered by the base station. Therefore, the base station transmits the broadcast control channel information with such a transmission power (e.g., radio wave intensity) that the receiving terminal can receive the broadcast control channel information whatever the receiving terminal is location with in the coverage area of the base station.

FIG. 1 is a diagram showing the structure of broadcast control channel information of a wireless communication system using the W-CDMA method. The broadcast control channel information has, for example, 64 blocks as shown in FIG. 1. Note that the after-mentioned expression "all the blocks of the broadcast control channel information" means one or more blocks constituting one piece of broadcast control channel information. In the case of FIG. 1, it means blocks 0 to 63. In addition, one block period (time needed by a base station to transmit one block) is approximately 20 msec.

Each block has data indicating an SFN (system frame number) and broadcast control block data (information necessary for communications). The SFN is data necessary for notifying receiving terminals (mobile terminals or the like) of the current system time. The SFN is represented by an integer.

One period of the SFNs is longer than a period of the broadcast control channel information (1280 msec). One period of the SFNs means the time period corresponding to (N-1) blocks when the SFN contained in the first block is zero and the SFN contained in the Nth block is also zero.

One period of the SFNs is an integral multiple of one period of the broadcast control channel information. Accordingly, by obtaining the SFN, the receiving terminal can determine the block number of the broadcast control block data corresponding to the SFN (information indicating where the broadcast control block data is in the broadcast control channel information). Note that the broadcast control block data corresponding to an SFN means the broadcast control block data contained in the same block in which the SFN is contained.

Consequently, the receiving terminal can recognize information necessary for communications based on transmitted blocks even if the block first received by the receiving terminal is not the same first block as when the receiving terminal started receiving the broadcast control channel information. The broadcast control channel information constituted as previously described is repeatedly transmitted from the base station across the coverage area thereof.

In order to reduce power consumption, the receiving terminal performs the following process. Once having obtained all the blocks of broadcast control channel information, the receiving terminal stores them in a built-in storage unit. Then, the receiving terminal reads out the broadcast control channel information from the storage unit as necessary.

Here, there may be cases where the contents of the broadcast control channel information transmitted from the base station varies with time. Therefore, among the blocks of the broadcast control channel information, specific blocks (e.g., blocks having block numbers of multiples of four) contain information only indicating, for example, "update of the Nth block." These specific blocks are hereinafter referred to as update notification blocks. Accordingly, once having obtained all the blocks of the broadcast control channel information, the receiving terminal receives only update notification blocks thereafter. And, if the blocks are not updated, the receiving terminal waits until the next transmission timing for update notification blocks.

Thus, the power consumption of the receiving terminal can be reduced. Consequently, the usable time of the battery of the receiving terminal can be elongated. Note that, in the case where information indicating the update of the broadcast control channel information is contained in the update notification blocks, the receiving terminal receives an updated block (hereinafter referred to as the update block) based on the contents of the update notification blocks. Then, from among the blocks stored in the storage unit, the receiving terminal rewrites the block corresponding to the update block with the received update block.

FIG. 2 is a flowchart showing a method for receiving and storing the broadcast control channel information using a conventional receiving terminal. First, the receiving terminal receives a synchronizing signal necessary for receiving the broadcast control channel signal (signal indicating broadcast control channel information) transmitted from a base station. The receiving terminal judges whether synchronization necessary for receiving a broadcast control channel signal is achieved based on the synchronizing signal (S200). If synchronization has been not achieved, the process of step S200 is performed. On the other hand, if synchronization has been achieved, the process of step S210 is performed.

At step S210, the receiving terminal receives the broadcast control channel information transmitted from the base station. Then, the receiving terminal judges whether a completion flag is ON (S220). The completion flag is information indicating whether all the blocks of the broadcast control channel information have already been stored in the built-in storage unit of the receiving terminal.

(1) If the completion flag is ON at step S220, the process of step S230 is performed. The receiving terminal obtains and decodes the SFN contained in each block of the received broadcast control channel information. The receiving terminal judges whether the SFN is a multiple of four based on the decoded result of the SFN (S230). If the SFN is not a multiple of four, the process of step S200 is performed. On the other hand, if the SFN is a multiple of four, the receiving terminal decodes the broadcast control block data corresponding to the SFN. Then, the receiving terminal judges whether there is an updated block based on the decoded result (S240).

If there is no updated block, the process of step S200 is performed. On the other hand, if there is an updated block, the receiving terminal deletes, from the storage unit, the block which has the same number as that of the updated block (S250). Then, the receiving terminal sets the completion flag to OFF (S260). The OFF setting of the completion flag indicates that at least one block of all the blocks of the broadcast control channel information has been stored in the storage unit. Then, information concerning the completion flag is stored in the storage unit. Subsequently, the process of step S200 is performed.

(2) If the completion flag is OFF at step S220, the receiving terminal decodes the SFN and the block contents (e.g., broadcast control block data) contained in each block of the received broadcast control channel information (S270). The receiving terminal stores each block in the storage unit such that the block corresponds to the block number (S280). The receiving terminal judges whether all the blocks of the broadcast control channel information have been stored in the storage unit (S290). If all the blocks have not been stored, the process of step S200 is performed. On the other hand, if all the blocks have been stored, the receiving terminal sets the completion flag to ON (S300). The ON setting of the completion flag indicates that all the blocks of the broadcast control channel information are stored in the storage unit. Then, information concerning the completion flag is stored in the storage unit. Subsequently, the process of step S200 is performed. FIG. 3 is a diagram showing one example of information stored in the storage unit (information concerning the blocks and the completion flag).

In wireless communication systems using wireless communication methods, such as CDMA, broadcast control channels are also prepared similarly to the above-described case. However, in such wireless communication methods as CDMA, user identification processes and channel identification processes are performed by means of spreading codes. Accordingly, such wireless communication methods have, for example, a feature in that interference affects communication quality. Hereinafter, the above-described feature will be outlined using drawings.

FIG. 4 is a view showing the configuration of a conventional wireless communication system. A wireless communication system has base stations, and receiving terminals (e.g., mobile terminals), each of which exists in an area covered by one base station (such an area is hereinafter referred to as a coverage area) and which receives various types of channel information from the base station. In FIG. 4, a wireless communication system having three base stations is shown as an example.

The base stations 11a, 11b, and 11c transmit broadcast control channel information using broadcast control channels A, B, and C, respectively. Each base station transmits broadcast control channel information using broadcast control channel A, B, or C with such a transmission power that the broadcast control channel information can reach the entire coverage area thereof.

However, broadcast control channel information is also necessary when handover control is performed. Accordingly, there are cases where broadcast control channel information is transmitted to places near and outside a coverage area. In FIG. 4, a receiving terminal 12b communicates with the base station 11b through communication channel 1. In addition, according to the characteristics of CDMA, all of the base stations 11a, 11b, and 11c communicate with receiving terminals using the same frequency. Therefore, the receiving terminal 12b inevitably receives not only a signal of communication channel 1, which is a desired wave signal, but also signals of broadcast control channels A, B, and C as interference signals (undesired signals).

The communication quality in a wireless communication method using CDMA depends on the ratio of desired wave power to interference power (SIR). Accordingly, an increase in an interference signal lowers the communication quality, causing an increase in required transmission power. Moreover, the capacities of communication channels are wasted. Therefore, the reduction of interference signals is an important issue.

For example, broadcast control channel B is a channel necessary for various kinds of control. However, the broadcast control channel information transmitted using broadcast control channel B becomes interference for the receiving terminal 12b. Here, the phrase "the broadcast control channel information becomes interference for the receiving terminal 12b" means that the signal indicating the broadcast control channel information has a nonnegligible level of intensity compared to a signal desired by the receiving terminal. Therefore, preventing situations where broadcast control channel information becomes interference for receiving terminals is an important issue.

Accordingly, heretofore, broadcast control channel information has been transmitted to receiving terminals which exist in the coverage area of the directional antennas of a base station, by the rotation of a beam having a beam angle smaller than a coverage angle (e.g., sector angle), which is an angle between two boundary lines of the coverage area.

According to this technology, broadcast control channel information is intermittently transmitted to receiving terminals by the rotation of a beam having a small beam angle. In addition, the base station transmits communication channel information across the coverage area thereof, for example, using a nondirectional antenna. Thus, while a receiving terminal is receiving the communication channel information, the broadcast control channel information is being intermittently transmitted to the receiving terminal. Consequently, situations where the broadcast control channel information becomes interference for the receiving terminal are prevented.

However, in the above-described conventional technology, there has been the following problem. If the beam angle of a beam containing the broadcast control channel information is set to be smaller than the coverage angle, the broadcast control channel information is transmitted to the receiving terminal not continuously but intermittently.

Accordingly, for example, in the case where the total block number of the broadcast control channel information, the coverage angle, a beam rotation angular velocity, and the like do not have appropriate values, there arises a situation where the receiving terminal cannot receive at least one block from among all the blocks of the broadcast control channel information. This problem will be described in detail below.

Description will be made taking as an example the case where the broadcast control channel information has a plurality of blocks. A case where the receiving terminal receives one block during the period in which the base station transmits ten blocks (blocks contained in the broadcast control channel information) is considered. Moreover, the total block number of the broadcast control channel information is assumed to be 64. In this case, if the receiving terminal remains stationary, some blocks permanently cannot be received by the receiving terminal.

Specifically, the following case is considered: the block number of the block first received by the receiving terminal is 0, the block number of the block subsequently received by the receiving terminal is 10, and the block number of the block subsequently received by the receiving terminal is 20. In this case, as the receiving terminal repeatedly receives one block during each period in which the base station transmits ten blocks, the receiving terminal receives up to the 54th block. Thereafter, the receiving terminal receives the 0th block again. Therefore, the receiving terminal permanently cannot receive the blocks having odd block numbers.

BRIEF SUMMARY OF THE INVENTION

An object of the present invention is to provide a wireless communication method, a base station, and a receiving terminal which can prevent situations where broadcast control channel information becomes interference for receiving terminals. Another object of the present invention is to provide a wireless communication method, a base station, and a receiving terminal in which receiving terminals can receive all the blocks of broadcast control channel information.

Specifically, among wireless communication methods of the present invention, one wireless communication method is a wireless communication method for transmitting broadcast control channel information having a plurality of blocks to a receiving terminal existing in a coverage area of a first directional antenna of a base station by rotation of a beam transmitted from the first directional antenna. The wireless communication method includes following steps. In a first calculation step, a transmission block number-related condition necessary for enabling the receiving terminal to receive all the blocks of the broadcast control channel information is calculated based on the total number of the blocks of the broadcast control channel information and a transmission block number. The transmission block number indicates the number of blocks of the broadcast control channel information which are transmitted by the first directional antenna during a reception period. The reception period indicates an interval between the time points when the receiving terminal receives the broadcast control channel information. In a second calculation step, a beam rotation angular velocity-related condition is calculated based on the transmission block number-related condition, a block unit time, and a coverage angle. The block unit time indicates a time period needed by the first directional antenna to transmit one block of the broadcast control channel information. The coverage angle indicates an angle between two boundary lines of the coverage area. In a control step, the first directional antenna is controlled to rotate the beam at a rotation angular velocity decided based on the beam rotation angular velocity-related condition.

BRIEF DESCRIPTION OF THE SEVERAL VIEWS OF THE DRAWINGS

FIG. 3 is a diagram showing an example of information concerning blocks and a completion flag, which is stored in a storage unit of a conventional receiving terminal.

DETAILED DESCRIPTION OF THE INVENTION

Figure 1:
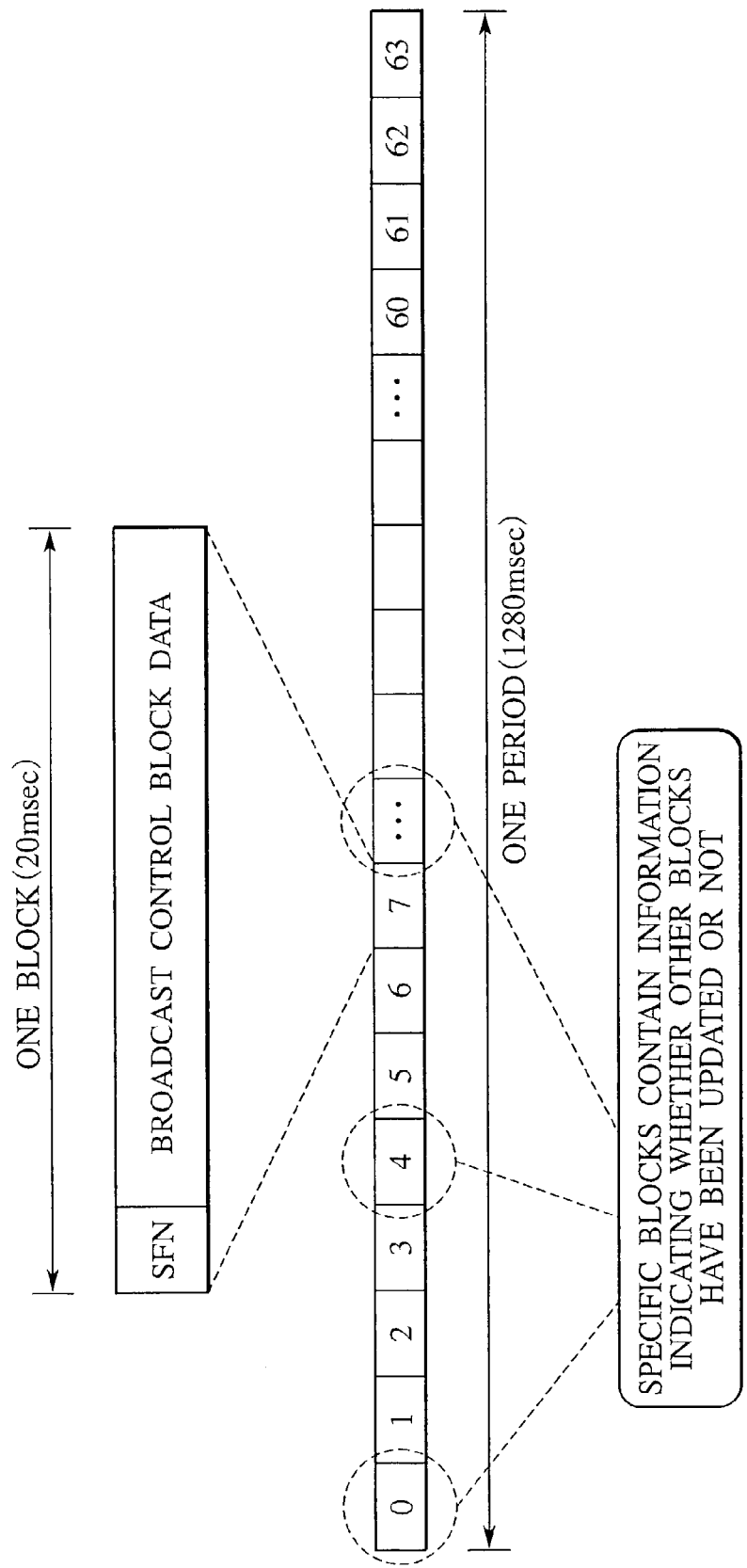
FIG. 1 is a diagram showing an example of the structure of broadcast control channel information.
Figure 2:
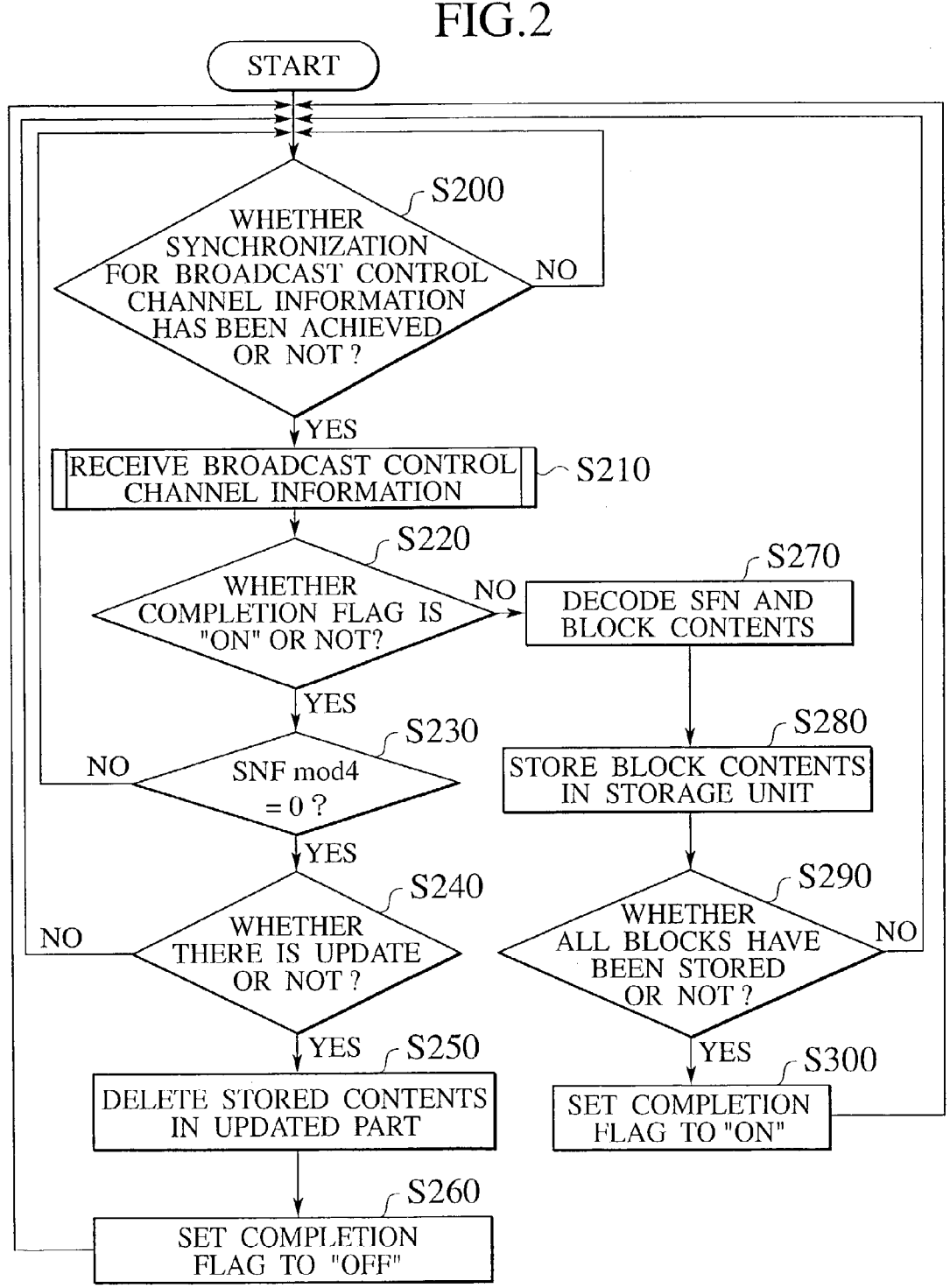
FIG. 2 is a flowchart necessary for explaining conventional methods for receiving and storing broadcast control channel information.
Figure 4:
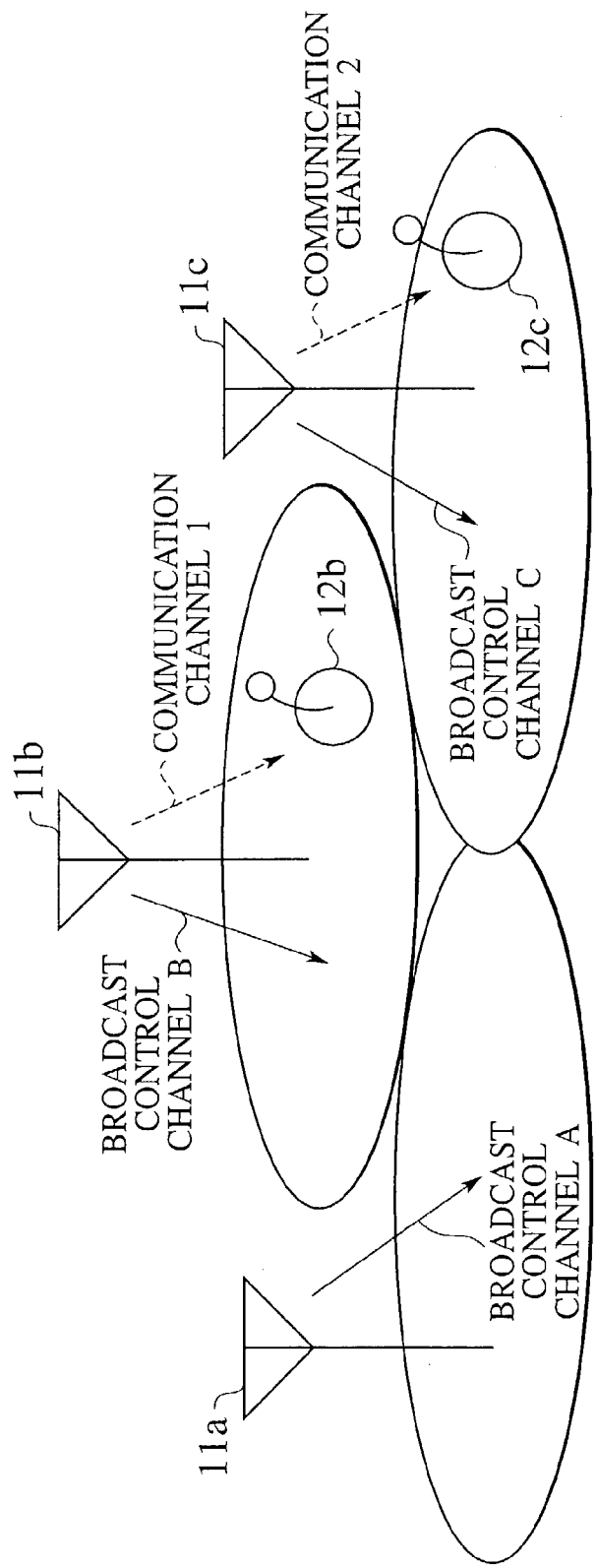
FIG. 4 is a view necessary for explaining a problem of a related art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of devices, it will be appreciated that the various drawings are not drawn to scale from one figure to another nor inside a given figure.

In the following descriptions, numerous specific details are set fourth such as specific signal values, etc. to provide a thorough understanding of the present invention. However, it will be obvious to those skilled in the art that the present invention may be practiced without such specific details. In other instances, well-conventional circuits have been shown in block diagram form in order not to obscure the present invention in unnecessary detail.

Embodiment (Configuration)

Figure 5:
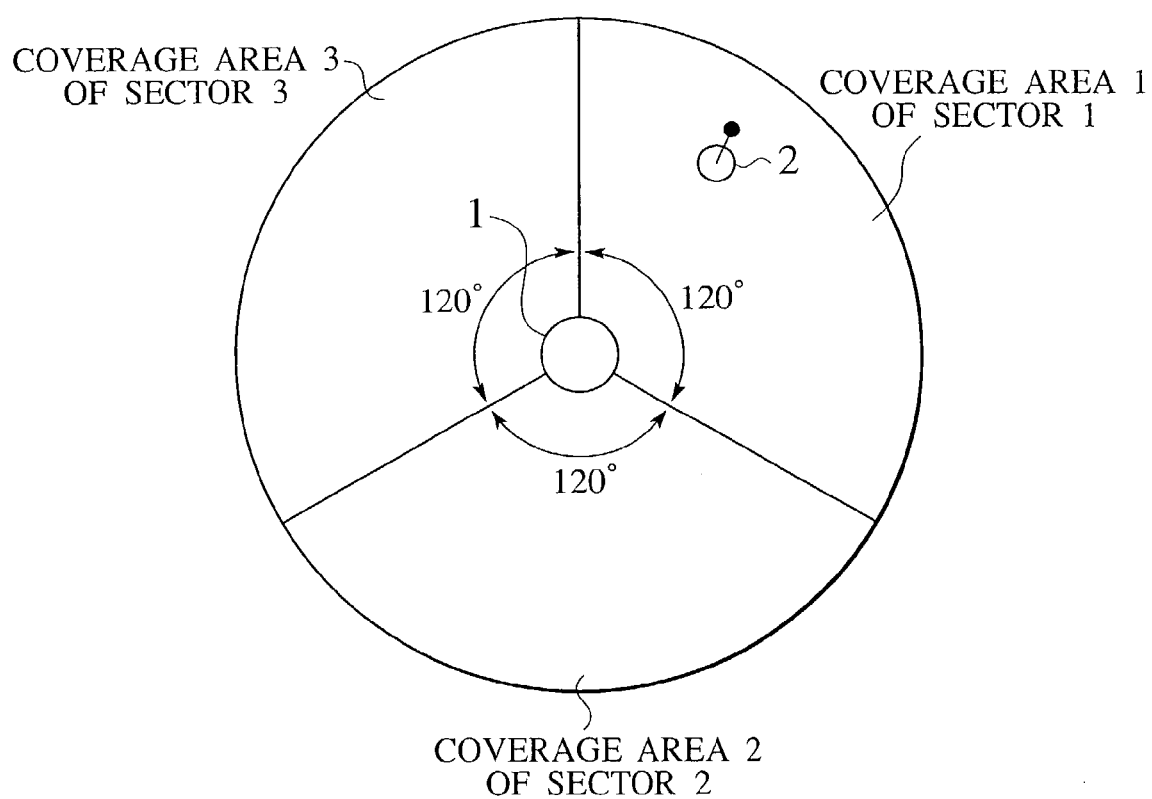
FIG. 5 is a diagram showing the configuration of a wireless communication system of an embodiment of the present invention.

FIG. 5 is a diagram showing the configuration of a wireless communication system of the embodiment. The wireless communication system has a base station 1 and a receiving terminal 2. The base station 1 transmits various kinds of channel information (e.g., broadcast control channel information) to the receiving terminal 2 existing in a coverage area (area covered by a first directional antenna 1b of the base station 1), which is an area covered by the base station 1. In the embodiment, the case where the base station 1 covers three areas (three-sector configuration) will be described as an example. In the case of a three-sector configuration, a coverage angle (e.g., sector angle), which is an angle between two boundary lines of each coverage area, is 120 degrees as shown in FIG. 5. Note that the term "boundary lines" here means the two boundary lines other than the boundary line in the rotation direction (i.e., circumferential direction) of a beam.

(Base Station)

Figure 6:
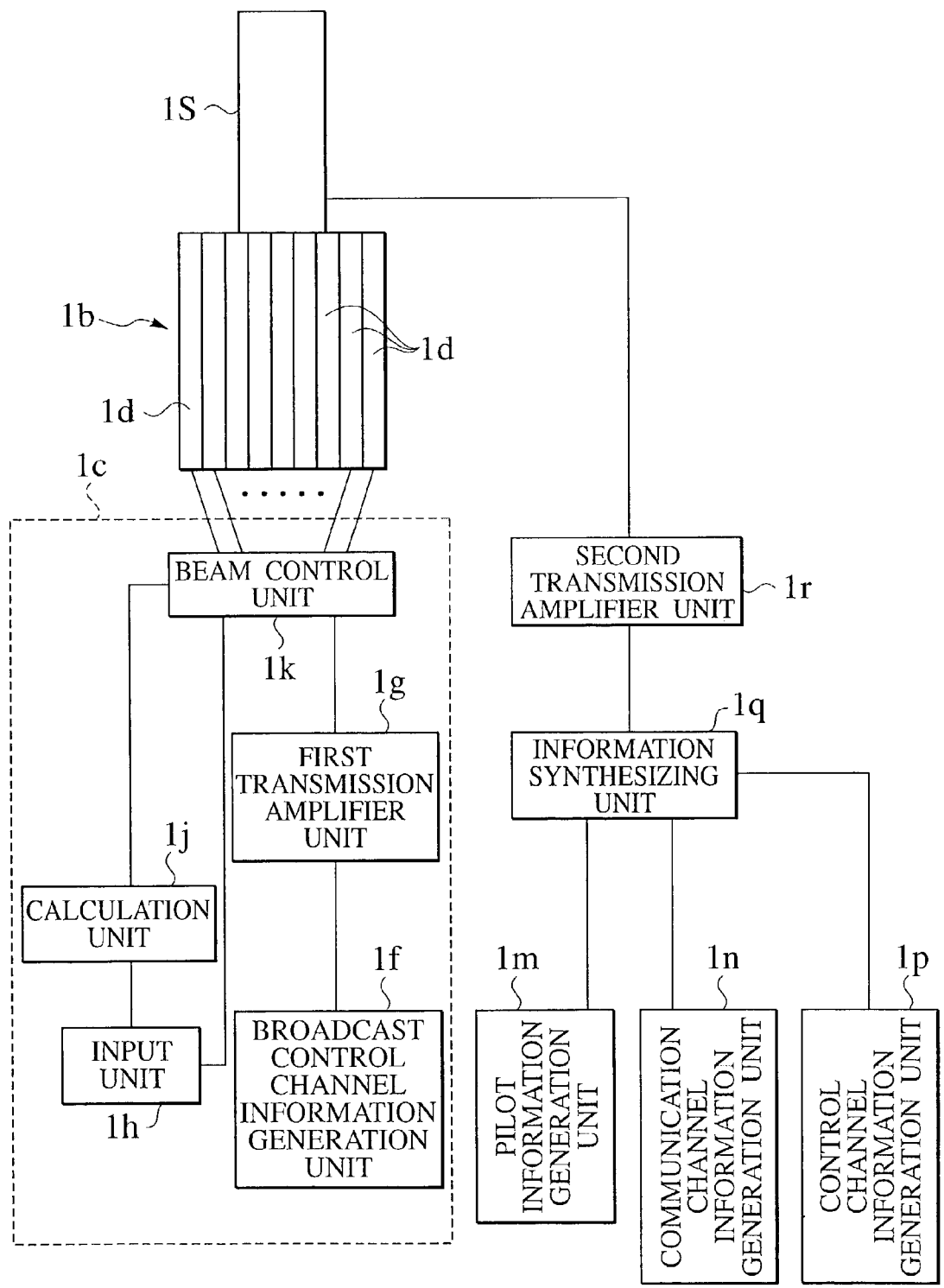
FIG. 6 is a diagram showing the configuration of a base station of the embodiment.

FIG. 6 is a diagram showing the configuration of the base station of this embodiment. The base station 1 has three (the number of sectors) first directional antennas 1b and three (the number of sectors) information generation units 1c. Note that the numbers of first directional antennas 1b and information generation units 1c may be arbitrary as long as they are equal to the number of sectors.

The first directional antennas 1b are independent of each other. Moreover, the information generation units 1c are also independent of each other. Consequently, information transmitted from each first directional antenna 1b is independent information.

Each first directional antenna 1b has a plurality of second directional antennas 1d. Each first directional antenna 1b is constituted, for example, as an array antenna. Each first directional antenna 1b transmits broadcast control channel information to the receiving terminal 2 existing in a coverage area (e.g., coverage area of sector 1), which is the area covered by one first directional antenna 1b, using a beam. Specifically, the second directional antennas 1d transmit beams having beam angles smaller than the coverage angle (120 degrees in this case) across the coverage area, thereby transmitting the broadcast control channel information to the receiving terminal 2.

Each information generation unit 1c includes a broadcast control channel information generation unit 1f, a first transmission amplifier unit 1g, an input unit 1h, a calculation unit 1j, a beam control unit 1k, and a display unit (not shown).

The broadcast control channel information generation unit 1f generates system information (e.g., ID information of the base station 1) in a predetermined form (such a form that matches the type of the wireless communications). For example, the broadcast control channel information generation unit 1f generates broadcast control channel information having a predetermined number of blocks. Specifically, in the case where the W-CDMA method is adopted as a wireless communication method, the broadcast control channel information generation unit 1f generates broadcast control channel information having 64 blocks (refer to FIG. 1).

The first transmission amplifier unit 1g amplifies the broadcast control channel information generated by the broadcast control channel information generation unit 1f. The broadcast control channel information amplified by the first transmission amplifier unit 1g is transmitted to the beam control unit 1k.

Into the input unit 1h, predetermined values (values concerning the design of the wireless communication system) are inputted. Specifically, into the input unit 1h are inputted the total block number of the broadcast control channel information; a block unit time, which is a time period needed by the first directional antenna 1b to transmit one block of the broadcast control channel information; the coverage angle; and the beam angle (an angle smaller than the coverage angle, and at the same time such an angle that the first directional antenna intermittently transmits the broadcast control channel information to the receiving terminal 2). Note that, though there are cases where the beam angle is not predetermined depending on the design of the wireless communication system, a description for such cases will be made later. Each piece of information inputted from the input unit 1h is transmitted to the calculation unit 1j.

The calculation unit 1j calculates a transmission block number-related condition which is necessary for enabling the receiving terminal 2 to receive all the blocks of the broadcast control channel information, based on the total block number of the broadcast control channel information and the transmission block number (first calculation process). The transmission block number indicates the number of the blocks of the broadcast control channel information transmitted by the first directional antenna 1b during a reception period, which indicates an interval between the time points when the receiving terminal 2 receives the broadcast control channel information. Then, the calculation unit 1j calculates a beam rotation angular velocity-related condition based on the calculated transmission block number-related condition, the block unit time, and the coverage angle (second calculation process). The beam rotation angular velocity-related condition is a condition which is necessary for enabling the receiving terminal 2 to receive all the blocks of the broadcast control channel information.

The calculation unit 1j calculates, for example, the following condition. Specifically, the calculation unit 1j calculates a transmission block number-related condition which is necessary for enabling the receiving terminal 2 to receive all the blocks, based on such a condition that the value obtained by multiplying first and second values (described later) together is equal to or larger than the total block number (first calculation process). Here, the first value is obtained by dividing the least common multiple of the total block number and the transmission block number by the transmission block number, and the second value is a reception block number indicating the number of the blocks of the broadcast control channel information received by the receiving terminal 2 during the reception period.

Then, the calculation unit 1j calculates a beam rotation angular velocity-related condition based on the transmission block number-related condition, the block unit time, the coverage angle, and a reception block number-related condition (second calculation process). The reception block number-related condition is calculated based on the beam rotation angular velocity and the maximum rotation angular velocity (value obtained by dividing the beam angle by the block unit time). A concrete method for this calculation by the calculation unit 1j will be described later.

The beam rotation angular velocity-related condition calculated by the calculation unit 1j is displayed on the display unit (not shown). Based on the display of the display unit (i.e., the calculated beam rotation angular velocity-related condition), for example, a system administrator decides a predetermined rotation angular velocity (such a rotation angular velocity that satisfies the calculated beam rotation angular velocity-related condition). Then, the administrator inputs the decided predetermined rotation angular velocity using the input unit 1h. The inputted rotation angular velocity is transmitted to the beam control unit 1k.

Figure 7:
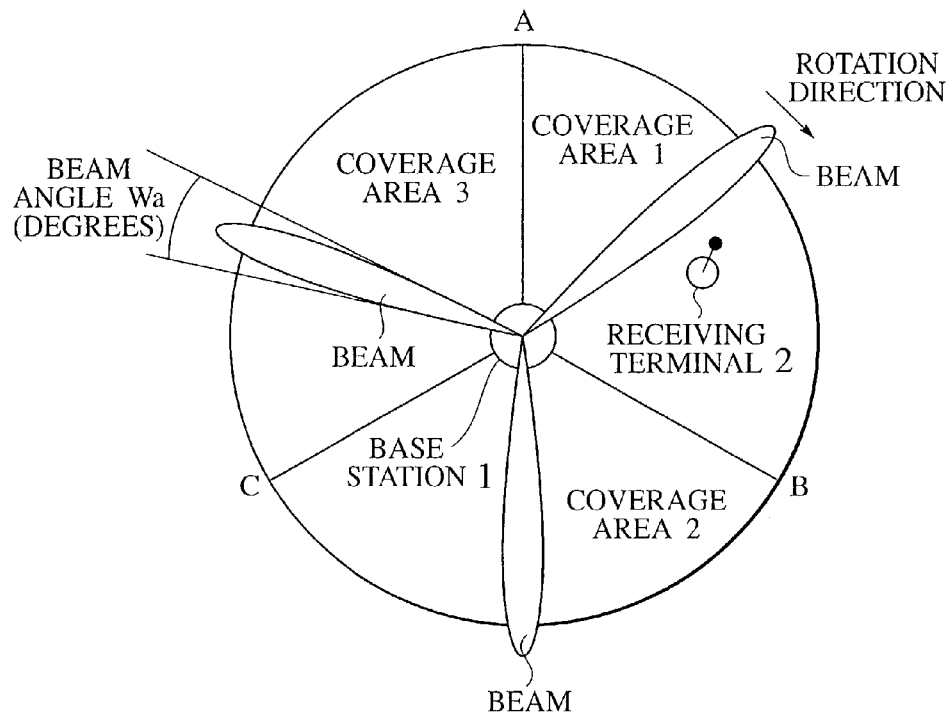
FIG. 7 is a supplementary diagram necessary for explaining a beam rotation control function of a beam control unit of the embodiment.

The beam control unit 1k has a beam generation control function and a beam rotation control function. FIG. 7 is a supplementary diagram necessary for explaining the beam rotation control function.

The beam control unit 1k controls the first directional antenna 1b so that a beam having a beam angle Wa (angle smaller than the coverage angle of 120 degrees) may be rotated at the predetermined rotation angular velocity decided based on the calculated beam rotation angular velocity-related condition.

Specifically, the beam control unit 1k selects any one second directional antenna 1d (or the plurality of adjacent second directional antennas 1d) from among the plurality of second directional antennas 1d. Here, it is assumed that a second directional antenna 1d has been selected. The beam control unit 1k transmits the broadcast control channel information outputted by the first transmission amplifier unit 1g to the selected second directional antenna 1d. Then, the beam control unit 1k causes the selected second directional antenna 1d to transmit a beam containing the broadcast control channel information.

Moreover, the beam control unit 1k sequentially switches the second directional antenna 1d which transmits the beam containing the broadcast control channel information, to another second directional antenna 1d along a predetermined direction, thereby rotating the beam. Note that the beam control unit 1k holds correspondence information indicating the correspondence relationship between the beam rotation angular velocity and an antenna switching speed. Then, the beam control unit 1k obtains the antenna switching speed corresponding to the transmitted beam rotation angular velocity based on the correspondence information. Then, the beam control unit 1k sequentially switches the second directional antenna 1d which transmits the beam containing the broadcast control channel information, to another second directional antenna 1d along a certain direction based on the obtained antenna switching speed.

As an example of the switching method, for example, there is a method as follows. Each second directional antenna 1d is set so as to transmit a beam containing the broadcast control channel information (broadcast control channel signal) having a predetermined phase. The beam control unit 1k changes the phase of the broadcast control channel information (broadcast control channel signal) outputted from the first transmission amplifier unit 1g at a phase changing speed corresponding to the antenna switching speed. Then, the beam control unit 1k causes the second directional antenna 1d corresponding to the phase of the broadcast control channel information to transmit a beam. Thus, the beam control unit 1k can sequentially switch the second directional antenna 1d which transmits the beam containing the broadcast control channel information, to another second directional antenna 1d.

Moreover, after the beam control unit 1k causes the second directional antenna 1d whose beam transmission direction is along one boundary line (line along the direction connecting the base station position O and point B, in the case of coverage area 1 shown in FIG. 7) of the coverage area to transmit a beam; the beam control unit 1k causes the second directional antenna 1d whose beam transmission direction is along the other boundary line (line along the direction connecting the base station position O and point A, in the case of coverage area 1 shown in FIG. 7) of the coverage area to transmit a beam. Thus, beams are continuously transmitted from the first directional antenna 1b across coverage area 1. The same is true for coverage areas 2 and 3.

Incidentally, in the case where the rotation direction is opposite to the rotation direction of FIG. 7, after the beam control unit 1k causes the second directional antenna 1d whose beam transmission direction is along one boundary line (line along the direction connecting the base station position O and point A, in the case of coverage area 1 shown in FIG. 7) of the coverage area to transmit a beam; the beam control unit 1k causes the second directional antenna 1d whose beam transmission direction is along the other boundary line (line along the direction connecting the base station position O and point B, in the case of coverage area 1 shown in FIG. 7) of the coverage area to transmit a beam. Each second directional antenna 1d transmits the broadcast control channel information to the receiving terminal 2 existing in the coverage area using a beam having a beam angle Wa. Note that, as shown in FIG. 7, the three first directional antennas 1b transmit beams to coverage areas 1, 2, and 3, respectively.

Moreover, the base station 1 includes a pilot information generation unit 1m, a communication channel information generation unit 1n, a control channel information generation unit 1p, an information synthesizing unit 1q, a second transmission amplifier unit 1r, and a nondirectional antenna 1s. The pilot information generation unit 1m generates pilot information. The pilot information is information needed by the receiving terminal 2 to establish synchronization with the wireless communication system. The communication channel information generation unit 1n is connected, for example, to a network. The communication channel information generation unit in generates communication channel information matching the design of the wireless communication system, based on call information transmitted from the network. The control channel information generation unit 1p generates information concerning a control channel other than the broadcast control channel.

The information synthesizing unit 1q generates one piece of synthesized information based on the information generated by the pilot information generation unit 1m, the information generated by the communication channel information generation unit in, and the information generated by the control channel information generation unit 1p. Then, the information synthesizing unit 1q transmits the synthesized information to the second transmission amplifier unit 1r. The second transmission amplifier unit 1r amplifies the synthesized information and then transmits the synthesized information to the nondirectional antenna 1s. The nondirectional antenna 1s transmits a beam containing the synthesized information.

The base station 1 constituted as described above transmits the broadcast control channel information across the coverage areas (e.g., coverage area 1), by rotating beams transmitted from the first directional antennas 1b in a certain direction in accordance with the decided rotation angular velocity. At this time, the nondirectional antenna 1s of the base station 1 transmits information, such as communication channel information, across the coverage areas (coverage areas 1, 2, and 3). Information including communication channel information is transmitted independently of the broadcast control channel information.

(Receiving Terminal)

Figure 8:
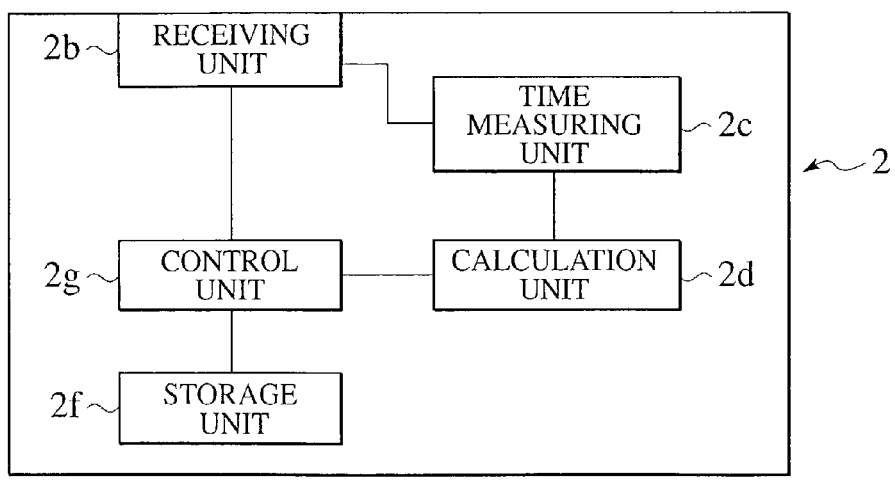
FIG. 8 is a diagram showing the configuration of a receiving terminal of the embodiment.

FIG. 8 is a diagram showing the configuration of the receiving terminal 2. The receiving terminal 2 includes a receiving unit 2b, a time measuring unit 2c, a calculation unit 2d, a storage unit 2f, and a control unit (reception control unit) 2g for controlling each unit. When a first directional antenna 1b of the base station 1 transmits the broadcast control channel information based on conditions which are necessary for enabling the receiving terminal 2 to receive all the blocks of the broadcast control channel information, the receiving unit 2b receives the broadcast control channel information. Specifically, the above process is as follows. As previously mentioned, the beam rotation angular velocity is decided based on conditions which are necessary for enabling the receiving terminal 2 to receive all the blocks of the broadcast control channel information. The first directional antenna 1b of the base station 1 transmits the broadcast control channel information across the coverage area, by rotating a beam at the decided beam rotation angular velocity. The receiving unit 2b of the receiving terminal 2 receives the transmitted broadcast control channel information. Note that the receiving unit 2b also receives various kinds of information other than the broadcast control channel information.

The time measuring unit 2c measures the time when the receiving unit 2b first begins receiving the broadcast control channel information, the time when the receiving unit 2b first terminates the reception of the broadcast control channel information, and the time when the receiving unit 2b next begins receiving the broadcast control channel information. Each measured time is transmitted to the calculation unit 2d.

The calculation unit 2d calculates the reception period (interval between the time points when the receiving unit 2b receives the broadcast control channel information) based on the time when the receiving unit 2b first begins receiving the broadcast control channel information and the time when the receiving unit 2b next begins receiving the broadcast control channel information. Moreover, the calculation unit 2d is already keeping the block unit time. Based on each measured time, the calculation unit 2d calculates the time period (hereinafter referred to as the broadcast control channel reception time period) in which the receiving unit 2b was receiving the broadcast control channel information during the reception period. The calculation unit 2d calculates the number of blocks (hereinafter referred to as the reception block number) completely received by the receiving unit 2b during the broadcast control channel reception time period, based on the block unit time. The calculation unit 2d calculates reception timing, which is the timing when the receiving unit 2b receives blocks of the broadcast control channel information during the reception period, based on each measured time and the reception block number. Note that the calculation method of the reception period and the calculation method of the reception timing are not limited to the above-described calculation methods.

Then, the calculation unit 2d calculates the reception-not-ready timing, which is the timing when the receiving unit 2b cannot receive a block of the broadcast control channel information, based on the reception period and the reception timing. The calculated reception-not-ready timing is transmitted to the control unit 2g.

The control unit 2g controls the receiving unit 2b so as not to perform a receiving operation during the calculated reception-not-ready timing. Moreover, in the storage unit 2f, various kinds of data (e.g., the blocks of the broadcast control channel information, and the communication channel information) received by the receiving unit 2b are stored.

(Wireless Communication Method)

An example of a wireless communication method using the above-described wireless communication system will be described below.

Figure 9:
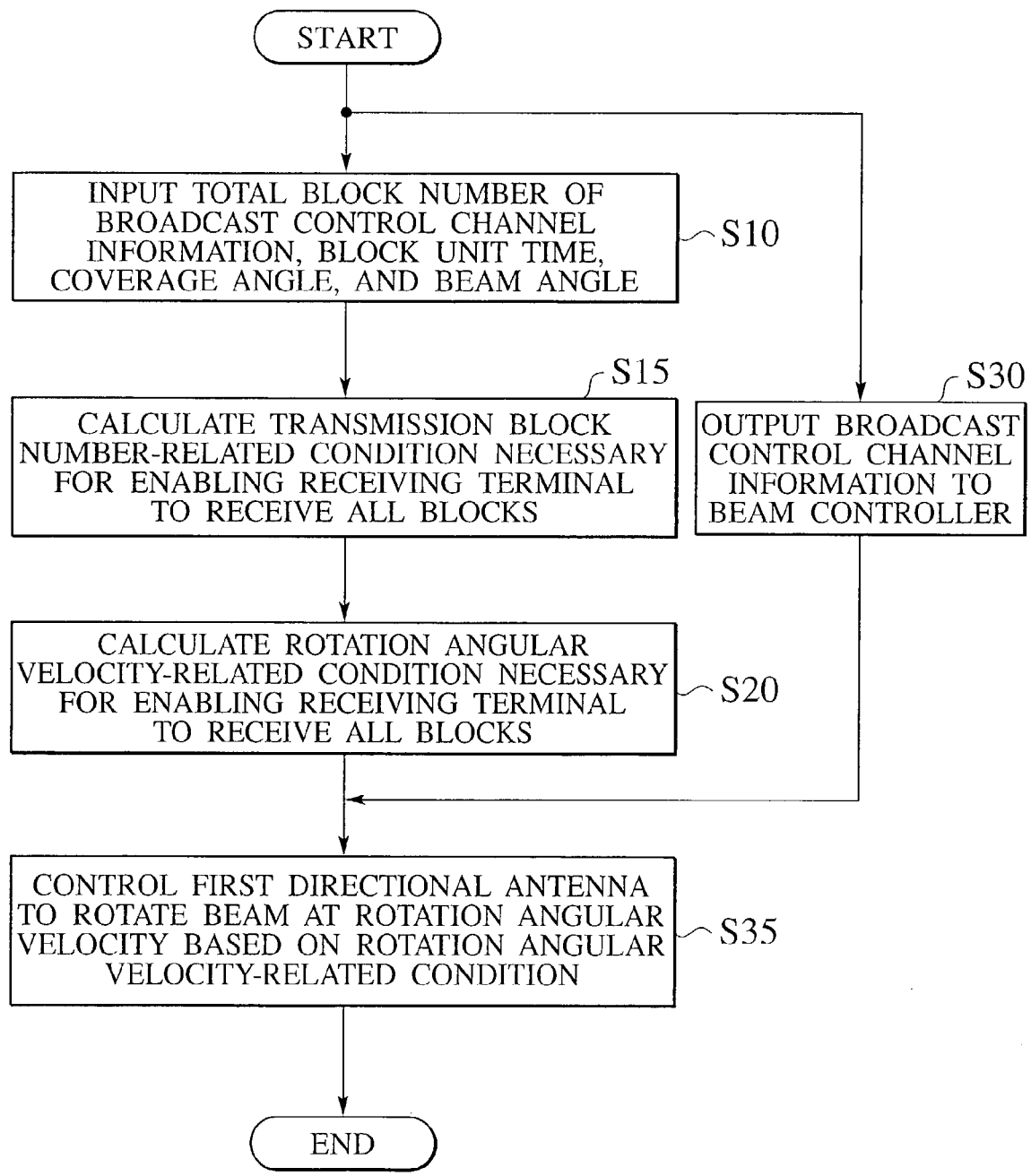
FIG. 9 is a flowchart necessary for explaining part of a wireless communication method of the embodiment.

(1) A Method by Which the Base Station 1 Transmits the Broadcast Control Channel Information FIG. 9 is a flowchart necessary for explaining a method by which the base station 1 transmits the broadcast control channel information to the receiving terminal 2 in the wireless communication method using the previously described wireless communication system.

First, for example, the administrator of the wireless communication system inputs the total block number (e.g., 64) of the broadcast control channel information which is predetermined in the design of the wireless communication system, the block unit time (e.g., 20 msec), the coverage angle (120 degrees as an example in this case), and the beam angle (e.g., an angle smaller than the coverage angle, and at the same time such an angle that a first directional antenna 1b intermittently transmits the broadcast control channel information to the receiving terminal 2, e.g., 12 degrees) using the input unit 1h (S10). The inputted various kinds of information are transmitted to the calculation unit 1j. The term "block" hereinafter means a block of the broadcast control channel information.

The calculation unit 1j calculates a transmission block number-related condition which is necessary for enabling the receiving terminal 2 to receive all the blocks, based on the total block number and the transmission block number (S15). Then, the calculation unit 1j calculates a beam rotation angular velocity-related condition (condition necessary for enabling the receiving terminal 2 to receive all the blocks), based on the calculated transmission block number condition, the block unit time, and the coverage angle (S20).

A detailed description of the processes of S15 and S20 are as follows. The calculation unit 1j calculates a transmission block number-related condition which is necessary for enabling the receiving terminal 2 to receive all the blocks, based on such a condition that the value obtained by multiplying first and second values (described later) together is equal to or larger than the total block number. Here, the first value is obtained by dividing the least common multiple of the total block number and the transmission block number by the transmission block number, and the second value is a reception block number indicating the number of the blocks of the broadcast control channel information received by the receiving terminal 2 during the reception period.

Then, the calculation unit 1j calculates a beam rotation angular velocity-related condition based on the transmission block number-related condition, the block unit time, the coverage angle, and a reception block number-related condition. The reception block number-related condition is calculated based on the beam rotation angular velocity and the maximum rotation angular velocity (value obtained by dividing the beam angle by the block unit time).

Hereinafter, using FIGS. 10 to 13, a calculation process for conditions which are necessary for enabling the receiving terminal 2 to receive all the blocks will be concretely described. The numerals shown in FIG. 11 are block numbers. Moreover, in FIGS. 11 to 13, the blocks having a plurality of diagonal lines drawn therein indicate blocks that the receiving terminal 2 can receive.

Figure 10:
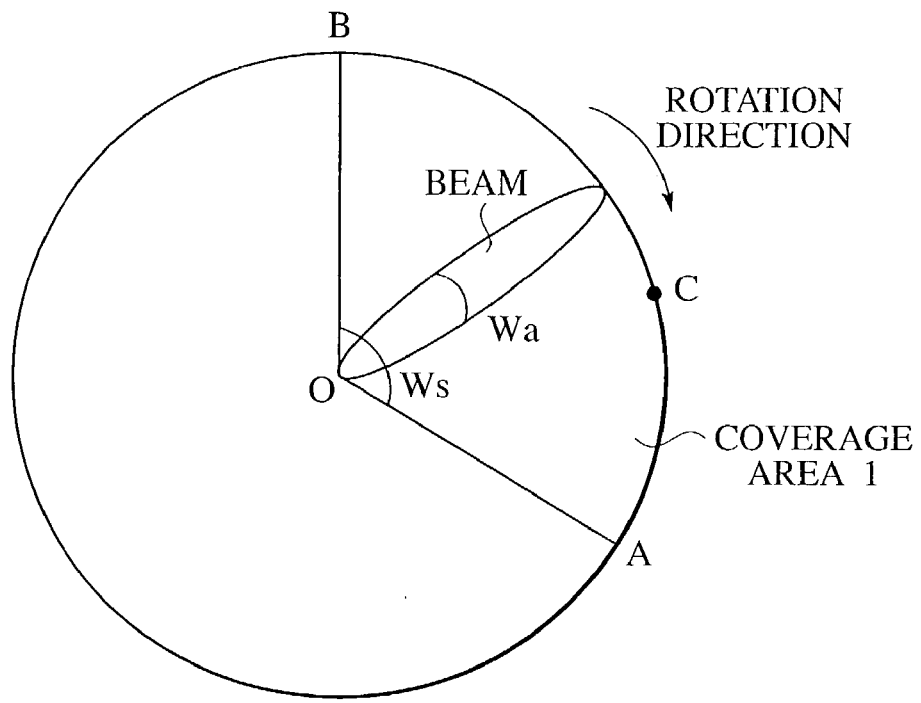
FIG. 10 is a supplementary diagram necessary for explaining conditions needed by the receiving terminal to receive all blocks in the embodiment.
Figure 11:
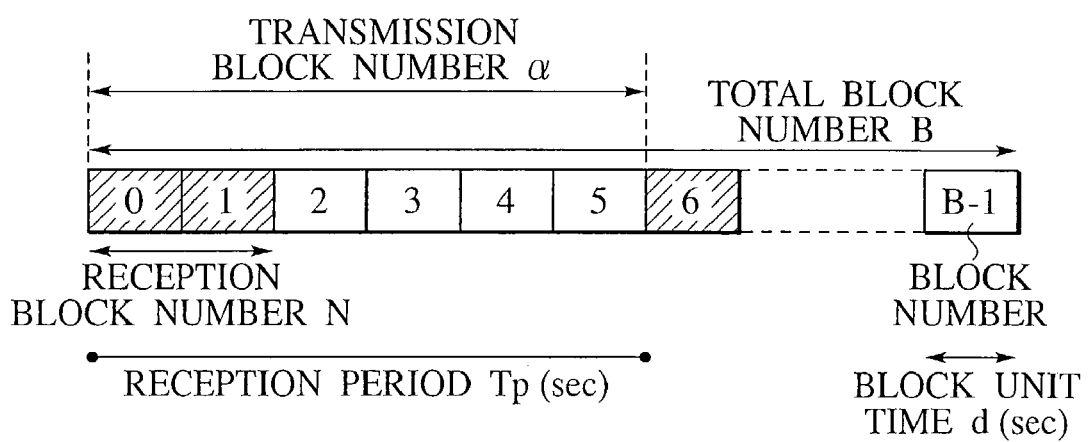
FIG. 11 is a supplementary diagram necessary for explaining the conditions needed by the receiving terminal to receive all the blocks in the embodiment.

As shown in FIG. 10, the case where a first directional antenna 1b of the base station (existing at the position of O) transmits the broadcast control channel information to the receiving terminal 2 existing in the coverage area (sector OAB) of the first directional antenna 1b (e.g., at the position C) is considered. Moreover, the coverage angle Ws (degrees), the beam angle Wa (degrees), the total block number B, which is the total number of the blocks of the broadcast control channel information, and the block unit time d (seconds) are assumed to be predetermined in the design of the wireless communication system. Here, the maximum rotation angular velocity ωmax of a beam is represented by the following expression (1).

$$\omega max = Wa/d \text{ (deg/sec)} \tag{1}$$

The reason is as follows. When a beam hits the receiving terminal 2, the receiving terminal 2 can receive the broadcast control channel information. Thereafter, when the beam deviates from the receiving terminal 2, the receiving terminal 2 cannot receive the broadcast control channel information anymore. Moreover, the receiving terminal 2 cannot receive one block of the broadcast control channel information in a case where the time period between the state in which the receiving terminal 2 can receive the broadcast control channel information and the state in which the receiving terminal 2 cannot receive the broadcast control channel information anymore is not equal to or larger than the block unit time. If the beam rotation angular velocity ω is equal to or less than ωmax, at least one block is received by the receiving terminal 2 while the beam is hitting the receiving terminal 2. Therefore, the rotation angular velocity ω is required to be of a value equal to or less than ωmax.

Consequently, the calculation unit 1j calculates a beam rotation angular velocity-related condition such that the beam rotation angular velocity is equal to or less than the maximum rotation angular velocity (value obtained by dividing the beam angle by the block unit time).

Next, the reception period Tp (seconds), which indicates an interval between the time points when the receiving terminal 2 receives the broadcast control channel information, is represented by the following expression (2).

$$Tp = Ws/\omega \text{ (sec)} \tag{2}$$

The reason is as follows. The beam transmitted from the first directional antenna 1b covering coverage area 1 is assumed to be rotating in a certain direction as shown in FIG. 10. Moreover, the beam transmission direction after the beam transmission direction has become the direction of OA is the direction of OB. Accordingly, in FIG. 10, if the receiving terminal 2 existing at position C receives the broadcast control channel information, for example, at time T, the next time when the receiving terminal 2 receives the broadcast control channel information is T+Ws/ω. Specifically, the period between the time points when the receiving terminal 2 receives the broadcast control channel information is Ws/ω. Therefore, the reception period Tp (seconds) is represented by the expression (2).

Moreover, as shown in FIG. 11, when the transmission block number indicating the number of blocks transmitted by the first directional antenna 1b during the reception period Tp is α and when the reception block number indicating the number of blocks received by the receiving terminal 2 during the reception period Tp is N, if the least common multiple L of the total block number B and the transmission block number α satisfies the following expression (3), the receiving terminal 2 can receive all the blocks.

$$L/\alpha * N \geq B \tag{3}$$

The reason will be described below. When the beam angle Wa is smaller than the coverage angle Ws, in order to prevent situations where the broadcast control channel information becomes interference for the receiving terminal 2, the receiving terminal 2 is required to intermittently receive the broadcast control channel information. Accordingly, there are blocks which the receiving terminal 2 cannot receive during the reception period Tp (e.g., blocks 2, 3, 4, and 5 shown in FIG. 11). Therefore, the blocks which the receiving terminal 2 can receive during the reception period Tp vary with time.

Figure 12:
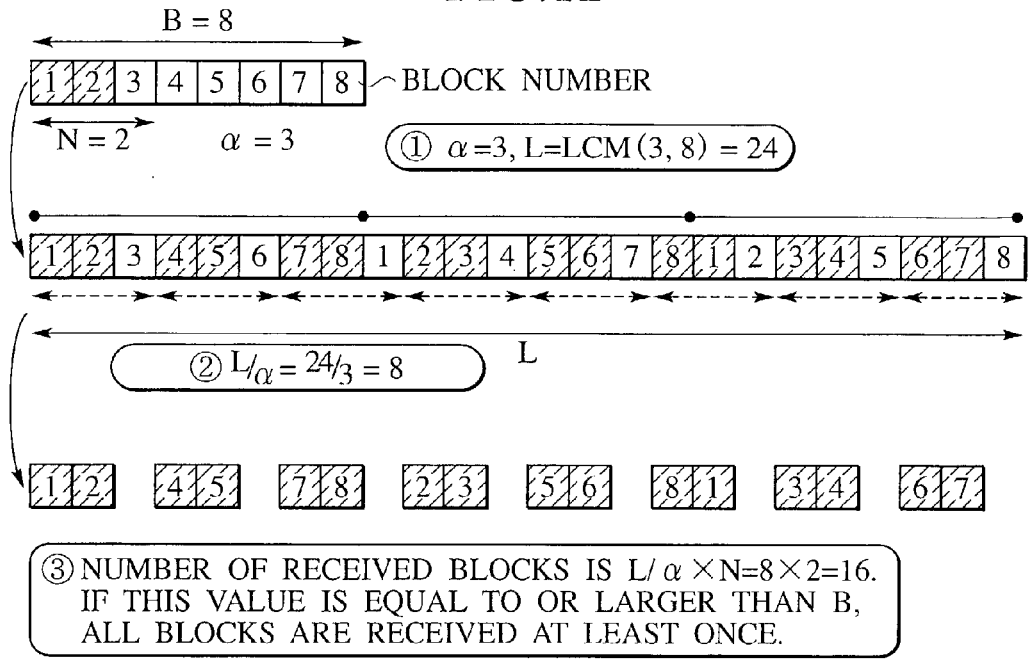
FIG. 12 is a supplementary diagram necessary for explaining the conditions needed by the receiving terminal to receive all the blocks in the embodiment.

FIG. 12 is a diagram showing the blocks which the receiving terminal 2 can receive (blocks having a plurality of diagonal lines drawn therein) and the blocks which the receiving terminal 2 cannot receive (blocks having no diagonal lines drawn therein) in the case where the total block number B is eight, the transmission block number a is three, and the reception block number N is two.

As shown in FIG. 12, the blocks which the receiving terminal 2 can receive during the reception period Tp changes from blocks 1 and 2 to blocks 4 and 5, and then to blocks 7 and 8 in accordance with time. Thus, the blocks which the receiving terminal 2 can receive during the reception period Tp vary with time. Accordingly, for example, if the receiving terminal 2 receives the block having a block number of 1 at time t, the next time when the receiving terminal 2 receives the block having a block number of 1 is time t+T1 (T1 is the time period for transmitting L blocks). Specifically, the period between the time points when the receiving terminal 2 receives the blocks having the same block numbers is the time period for transmitting N blocks.

For example, in the case shown in FIG. 12, the number L of blocks is 24. In this case, the period between the time points when the receiving terminal 2 receives the blocks having the same block numbers (e.g., block number 1) is the time period for transmitting L (L=24) blocks. In the case of FIG. 12, each time when L (L=24) blocks are transmitted, the receiving terminal 2 receives the blocks having block numbers of 1, 2, 4, 5, 7, 8, 2, 3, 5, 6, 8, 1, 3, 4, 6, and 7.

Moreover, L/α is a reception count, which indicates the count of times that the receiving terminal 2 receives a beam (beam containing the broadcast control channel information) within the time period when L (L=24) blocks are transmitted. For example, in a case where a beam hits the receiving terminal once and then deviates from the receiving terminal, the reception count is one. N indicates the number of the blocks which the receiving terminal 2 receives between the time when a beam hits the receiving terminal and the time when the beam deviates from the receiving terminal.

Consequently, it can be said that L/α*N indicates the number of the blocks of the broadcast control channel information which the receiving terminal 2 receives during the time period when L (L=24) blocks are transmitted. Moreover, the blocks which the receiving terminal 2 can receive during the reception period Tp vary with time. For example, the blocks which the receiving terminal 2 can receive during the first reception period Tp are blocks 1 and 2, whereas the blocks which the receiving terminal 2 can receive during the second reception period Tp are blocks 4 and 5.

Therefore, if the relationship L/α*N≧B is satisfied, it can be said that the receiving terminal 2 can receive all the blocks (blocks 1 to 8) of the broadcast control channel information while L (L=24) blocks are transmitted.

Figure 13:
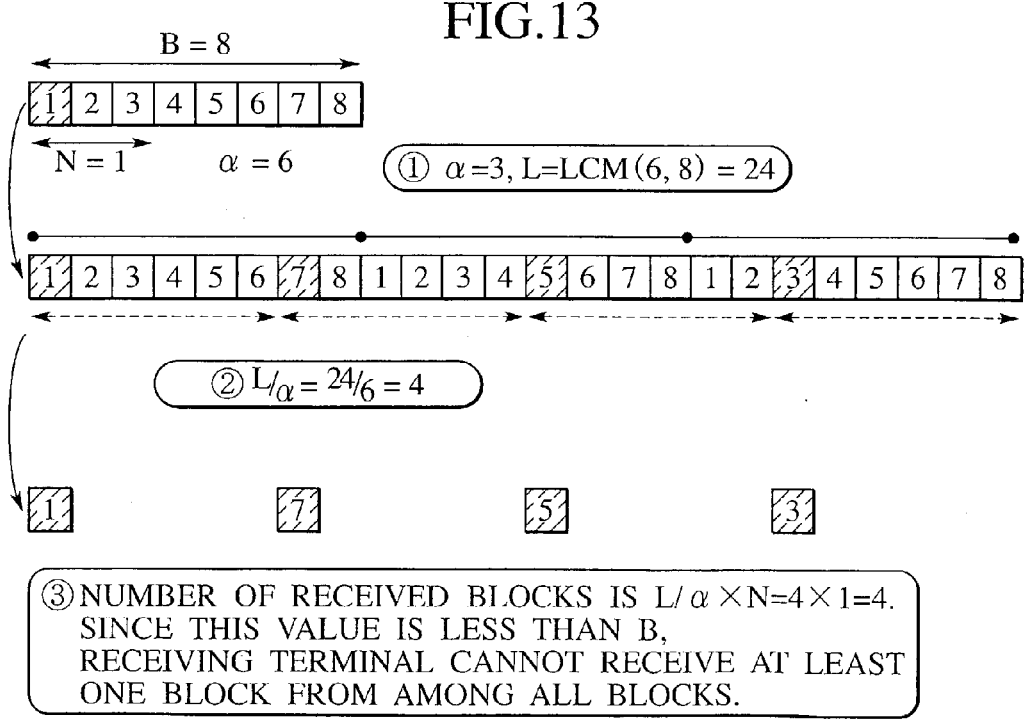
FIG. 13 is a supplementary diagram necessary for explaining the conditions needed by the receiving terminal to receive all the blocks in the embodiment.

For example, as shown in FIG. 13, if B=8, α=6, and N=1, the relationship L/α*N≧B is not satisfied. Accordingly, the receiving terminal 2 cannot receive one or more blocks among all the blocks of the broadcast control channel information. Also, if B=64, α=10, and N=1, the relationship L/α*N≧B is not satisfied. Accordingly, the receiving terminal 2 cannot receive one or more blocks among all the blocks of the broadcast control channel information. On the other hand, if B=53, α=10, and N=2, the relationship L/α*N≧B is satisfied. Accordingly, the receiving terminal 2 can receive all the blocks (blocks 1 to 8) of the broadcast control channel information.

In the case where the relationship L/α*N≧B is satisfied, the following expression (4) is derived as a condition relating to the transmission block number α.

$$L(\alpha, B)/\alpha \geq B/N \quad (4)$$

Moreover, the transmission block number α is derived as Tp/d based on the definition of the transmission block number α.

In addition, the reception block number N is the integer part of the value represented by ωmax/ω. The reason is described below. As mentioned previously, if the beam rotation angular velocity ω is ωmax, the receiving terminal 2 can receive one block between the time when the beam hits the receiving terminal 2 and the time when the beam deviates from the receiving terminal 2. On the other hand, if the beam rotation angular velocity ω is ωmax/2, the receiving terminal 2 can receive two consecutive blocks between the time when the beam hits the receiving terminal 2 and the time when the beam deviates from the receiving terminal 2. Accordingly, if the beam rotation angular velocity ω is ωmax/N, it can be said that the receiving terminal 2 can receive N consecutive blocks between the time when the beam hits the receiving terminal 2 and the time when the beam deviates from the receiving terminal 2. Consequently, it can be said that the integer part of ωmax/ω is the number of the blocks which the receiving terminal 2 can consecutively receive between the time when the beam hits the receiving terminal 2 and the time when the beam deviates from the receiving terminal 2.

Therefore, a relational expression using the beam rotation angular velocity ω, based on condition 1 (α=Tp/d), condition 2 (N is the integer part of the value represented by ωmax/ω), condition 3 (L (α, B)/α≧B/N), and condition 4 (expression (2)) is derived. This relational expression is a condition which is necessary for enabling the receiving terminal 2 to receive all the blocks of the broadcast control channel information.

The calculation unit 1j calculates a beam rotation angular velocity-related condition based on the relational expression using the beam rotation angular velocity ω and the data inputted to the input unit. The calculated beam rotation angular velocity-related condition is displayed on the display unit. Based on the condition displayed on the display unit, for example, the administrator decides the beam rotation angular velocity. Then, the administrator inputs the decided beam rotation angular velocity using the input unit 1h. The inputted beam rotation angular velocity is transmitted to the beam control unit 1k. Note that the calculation unit 1j may automatically decide the beam rotation angular velocity based on the calculated beam rotation angular velocity-related condition. For example, the calculation unit 1j may select the minimum (or maximum) rotation angular velocity from among the rotation angular velocities satisfying the calculated beam rotation angular velocity-related condition.

Moreover, parallel to the processes of steps S10 to S20, the following process is also performed. The broadcast control channel information generation unit 1f generates the broadcast control channel information having a predetermined number of blocks. Then, the first transmission amplifier unit 1g amplifies the generated broadcast control channel information. The first transmission amplifier unit 1g outputs the amplified broadcast control channel information to the beam control unit 1k (S30).

The beam control unit 1k controls the first directional antenna 1b such that a beam is rotated in accordance with the rotation angular velocity decided based on the rotation angular velocity-related condition (S35). A concrete description of this step is as mentioned previously.

After these processes, a beam rotates at the rotation angular velocity, whereby the broadcast control channel information is intermittently transmitted to the receiving terminal 2 existing in coverage area 1 (refer to FIG. 10).

(2) A Process by Which the Base Station 1 Transmits Communication Channel Information Parallel to the above-described process for transmitting the broadcast control channel information, a process for transmitting communication channel information is performed as follows.

The pilot information generation unit 1m generates pilot information and transmits the pilot information to the information synthesizing unit 1q. The communication channel information generation unit 1n generates communication channel information and transmits the communication channel information to the information synthesizing unit 1q. The control channel information generation unit 1p generates information concerning the control channel other than the broadcast control channel and transmits the generated information to the information synthesizing unit 1q.

The information synthesizing unit 1q generates one piece of synthesized information based on the information generated by the pilot information generation unit 1m, the information generated by the communication channel information generation unit 1n, and the information generated by the control channel information generation unit 1p. Then, the information synthesizing unit 1q transmits the synthesized information to the second transmission amplifier unit 1r. After the second transmission amplifier unit 1r amplifies the synthesized information, the second transmission amplifier unit 1r transmits the synthesized information to the nondirectional antenna 1s. The nondirectional antenna 1s transmits a beam containing the synthesized information across the coverage area (e.g., coverage areas 1, 2, and 3 shown in FIG. 7 in this case).

Figure 14:
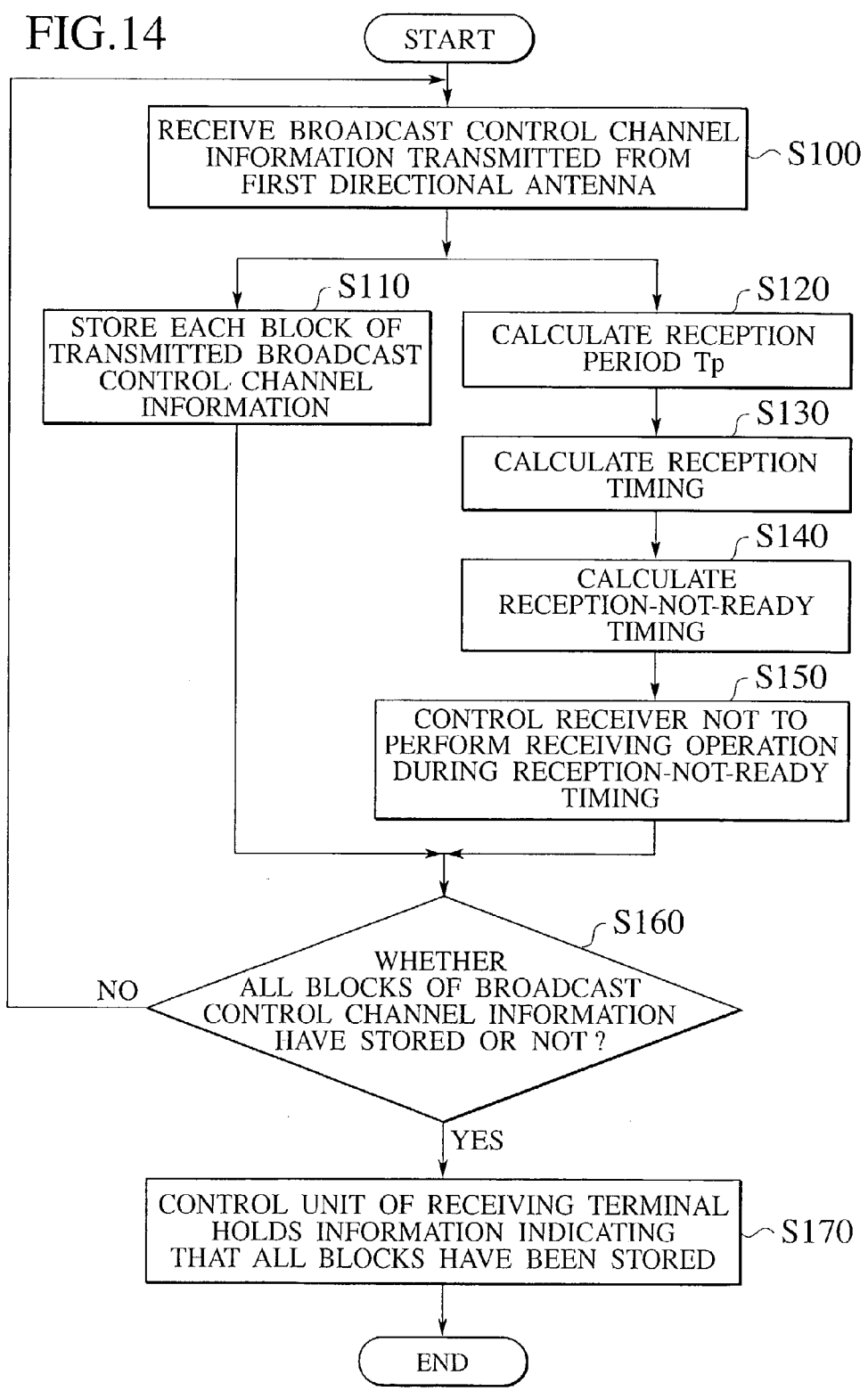
FIG. 14 is a flowchart necessary for explaining part of the wireless communication method of the embodiment.
Figure 15:
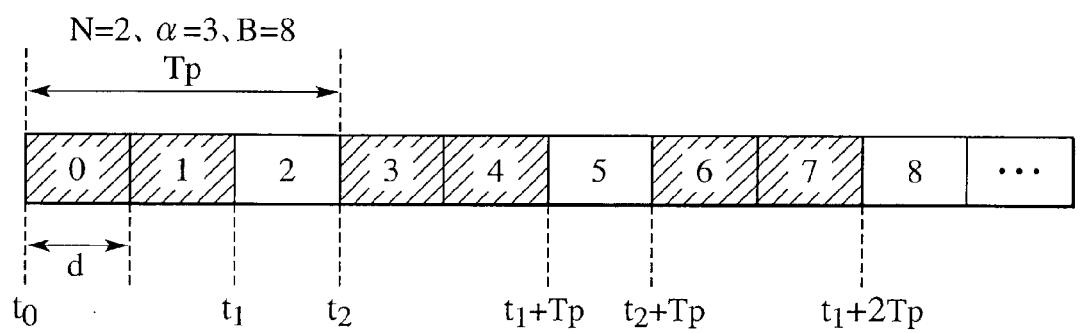
FIG. 15 is a supplementary diagram necessary for explaining part of the wireless communication method of the embodiment.

(3) A Process by Which the Receiving Terminal 2 Receives the Broadcast Control Channel Information FIG. 14 is a flowchart necessary for explaining a method by which the receiving terminal 2 receives the broadcast control channel information. FIG. 15 is a diagram for supplementing the explanation for the receiving method. FIG. 15 is a diagram showing the relationship among the blocks of the broadcast control channel information and various kinds of time information (such as reception start time) in the case where N=2, α=3, and B=8.

The numerals shown in FIG. 15 are block numbers. In addition, the blocks having a plurality of diagonal lines drawn therein indicate the blocks which the receiving terminal 2 can receive. The blocks having no diagonal lines drawn therein indicate the blocks which the receiving terminal 2 cannot receive.

The user of the receiving terminal 2 turns on the receiving terminal 2. Upon receiving a radio wave transmitted from each base station 1, the receiving unit 2b of the receiving terminal 2 transmits each radio wave to the control unit 2g. The control unit 2g calculates the intensity of each radio wave. The control unit 2g determines the base station 1 transmitting the most intensive radiowave based on the calculated result. The control unit 2g of the receiving terminal 2 instructs the receiving unit 2b to receive a signal indicating the broadcast control channel information transmitted from the base station 1. The receiving unit 2b executes the instruction.

The receiving unit 2b of the receiving terminal 2 receives the broadcast control channel information transmitted from a first directional antenna 1b of the base station 1 (S100). In this process, the first directional antenna 1b transmits the broadcast control channel information to the receiving terminal 2 by rotating a beam at the beam rotation angular velocity decided as previously described.

The broadcast control channel information received by the receiving unit 2b is transmitted to the control unit 2g. The control unit 2g holds data of an amount equivalent to one block (one block contained in the broadcast control channel information). The control unit 2g decodes the data amount of the transmitted broadcast control channel information. Then, the control unit 2g obtains the SFN contained in the broadcast control channel information, and decodes a block number based on the SFN. The control unit 2g allows each block of the broadcast control channel information to correspond to a block number. Subsequently, the control unit 2g stores each block of the broadcast control channel information in the storage unit 2f (S110). Moreover, the control unit 2g stores the block number of each block stored in the storage unit 2f, in a built-in register thereof.

Parallel to the above-described process, the following process is performed. The time measuring unit 2c measures the time when the receiving unit 2b first begins receiving the broadcast control channel information (time t0 shown in FIG. 15), the time when the receiving unit 2b first terminates the reception of the broadcast control channel information (time t1 shown in FIG. 15), and the time when the receiving unit 2b next begins receiving the broadcast control channel information (time t2 shown in FIG. 15).

Each measured time is transmitted to the calculation unit 2d. The calculation unit 2d calculates the time difference between time t2 and time t0 based on time t0 and time t2. The calculation unit 2d calculates the reception period Tp based on the time difference (S120).

Moreover, the calculation unit 2d calculates the time difference between time t0 and time t1. Then, the calculation unit 2d calculates the reception block number, which is the number of the blocks completely received by the receiving unit 2b during the time difference (t1−t0), based on the time difference and the block unit time d. Specifically, the calculation unit 2d calculates, as the reception block number, the integer part of the value represented by (t1−t0)/d. Here, a description will be made for the case of (t1−t0)/d=2 as shown in FIG. 15.

Then, the calculation unit 2d calculates the reception timing based on the calculated reception block number, each measured time, and the reception period Tp (S130). The reception timing means the timing when the receiving unit 2b receives blocks of the broadcast control channel information during the reception period Tp. For example, in the case of FIG. 15, the time period from time to t0 time t1 is calculated as the reception timing.

Next, the calculation unit 2d calculates the timing when the receiver 2d cannot receive a block of the broadcast control channel information during the reception period Tp, based on each measured time and the reception timing (time period from time to t0 time t1). Specifically, the calculation unit 2d calculates that the timing when the receiving unit 2b cannot receive a block of the broadcast control channel information during the reception period Tp is the time period from time t1 to time t2, based on the reception timing (time period from time to t0 time t1).

Moreover, the calculation unit 2d calculates the reception-not-ready timing, which is the timing when the receiving unit 2b cannot receive a block of the broadcast control channel information, based on the calculated timing (time period from time t1 to time t2) and the reception period Tp (S140).

Note that the phrase "having received a block" here means having received one whole block. For example, in the case where the receiving unit 2b has received only a half of one block, it cannot be said that the receiving unit 2b has received a block.

For example, in the case of FIG. 15, the calculation unit 2d calculates, as the reception-not-ready timing, the time period from time t1+n (n is an integer equal to or larger than zero)*Tp to time t2+n*Tp. The reception-not-ready timing calculated by the calculation unit 2d is transmitted to the control unit 2g.

The control unit 2g controls the receiving unit 2b so as not to perform a receiving operation during the calculated reception-not-ready timing (S150). Specifically, the control unit 2g instructs a power supply unit (not shown) not to supply power to the receiving unit 2b during the reception-not-ready timing. The power supply unit executes the instruction from the control unit 2g.

Then, the control unit 2g refers to the register to judge whether all the blocks of the broadcast control channel information have been stored in the storage unit 2f (S160).

If all the blocks have been stored, the control unit 2g holds information indicating that all the blocks have been stored (s170). On the other hand, if all the blocks are not stored, the process of step S100 is performed.

After the process of S170, the receiving terminal 2 performs a process as described below. As previously mentioned, the base station 1 transmits the communication channel information to the coverage area through the non-directional antenna 1s. The receiving terminal 2 performs the following process as necessary after the receiving terminal 2 receives all the blocks of the broadcast control channel information and stored them in the storage unit 2f. The receiving terminal 2 receives various kinds of information (e.g., pilot information, communication channel information, and control channel information).

Incidentally, though the present invention can be applied to the W-CDMA wireless communication method as previously described, the present invention is not limited to this. The present invention can be applied to various wireless communication methods. Moreover, in the embodiment, a description has been made for a case where the number of sectors is three, but the present invention is not limited to this. Specifically, the present invention can also be applied to a wireless communication system having an arbitrary number of sectors. Further, the present invention can be applied to a wireless communication system without a sector structure. Note that, in this case, a coverage angle is 360 degrees and the number of first directional antennas 2b which a base station has is one.

(Advantages)

In this embodiment, the calculation unit 1j calculates a transmission block number-related condition (condition necessary for enabling the receiving terminal 2 to receive all the blocks of the broadcast control channel information) based on the total block number of the broadcast control channel information and the transmission block number, which indicates the number of the blocks of the broadcast control channel information transmitted by the first directional antenna 1b during the reception period. Then, the calculation unit 1j calculates a beam rotation angular velocity-related condition based on the transmission block number-related condition, the block unit time, and the coverage angle. Subsequently, the beam control unit 1k of the base station 1 controls the first directional antenna 1b such that a beam rotates at the rotation angular velocity decided based on the beam rotation angular velocity-related condition.

For example, if the first directional antenna 1b intermittently transmits the broadcast control channel information to the receiving terminal 2, situations where the broadcast control channel information becomes interference for the receiving terminal 2 are prevented.

Here, when the first directional antenna 1b intermittently transmits the broadcast control channel information to the receiving terminal 2, if a beam does not rotate at an appropriate rotation angular velocity, there is a disadvantage as follows. Specifically, there are cases where some blocks among all the blocks of the broadcast control channel information cannot be received by the receiving terminal 2 permanently.

As previously mentioned, in this embodiment, the calculation unit 1j calculates a rotation angular velocity-related condition which is necessary for enabling the receiving terminal 2 to receive all the blocks of the broadcast control channel information. Then, the beam control unit 1k of the base station 1 controls the first directional antenna 1b such that a beam rotates at the rotation angular velocity decided based on the calculated rotation angular velocity-related condition. Accordingly, even if the broadcast control channel information is intermittently transmitted from the first directional antenna to the receiving terminal 2, the receiving terminal 2 can receive all the blocks of the broadcast control channel information.

Therefore, according to this embodiment, situations where the broadcast control channel information becomes interference for the receiving terminal 2 are prevented. Moreover, the receiving terminal 2 can receive all the blocks of the broadcast control channel information.

Further, the beam control unit 1k sequentially switches the second directional antenna 1d which transmits a beam containing the broadcast control channel information, to another second directional antenna 1d along a predetermined direction, thereby rotating the beam. In addition, after the beam control unit 1k causes the second directional antenna 1d having a beam transmission direction along one boundary line of the coverage area to transmit a beam, the beam control unit 1k causes another second directional antenna 1d having a beam transmission direction along the other boundary line of the coverage area to transmit a beam.

Accordingly, beams containing the broadcast control channel information are continuously transmitted across the coverage area. Therefore, the time necessary for storing all the blocks of the broadcast control channel information in the receiving terminal 2 is shortened.

Moreover, the receiving terminal 2 of this embodiment has the receiving unit 2b. When the first directional antenna 1b transmits the broadcast control channel information based on such conditions that the receiving terminal 2 can receive all the blocks of the broadcast control channel information, the receiving unit 2b receives the broadcast control channel information. In this case, the broadcast control channel information is intermittently transmitted to the receiving terminal 2. Accordingly, even if the receiving terminal 2 waits in a state capable of receiving the broadcast control channel information, there are cases where the broadcast control channel information is not transmitted to the receiving terminal 2.

Therefore, in this embodiment, the calculation unit 1j of the receiving terminal 2 calculates the reception-not-ready timing, which is the timing when the receiving unit 2b cannot receive a block of the broadcast control channel information, based on the reception period and the timing when the receiving unit 2b receives blocks of the broadcast control channel information during the reception period. Then, the control unit 2g controls the receiving unit 2b so as not to perform a receiving operation of the broadcast control channel information during the reception-not-ready timing.

Thus, the receiving unit 2b performs a receiving operation during the timing when blocks of the broadcast control channel information are being transmitted, and does not perform a receiving operation during the timing when blocks of the broadcast control channel information are not being transmitted. Accordingly, electric power necessary for operations of the receiving unit 2b is reduced, thus making it possible to increase the battery life of the receiving terminal 2.

In addition, in this embodiment, the beam angle of a beam containing the broadcast control channel information is smaller than the coverage angle. Moreover, the area covered by the base station 1 is approximately as large as that of a conventional base station. Accordingly, it is possible to reduce an interference signal (interference signal related to the broadcast control channel information) received by the receiving terminal 2.

Furthermore, when the beam angle is small and the area covered by the base station 1 is approximately as large as that of a conventional base station, it is possible to reduce the electric power needed by the base station 1 to transmit the broadcast control channel information. Accordingly, it is possible to increase the electric power necessary for transmitting the communication channel information compared to a conventional base station. Thus, the subscriber capacity of the wireless communication system is increased. On the other hand, when the beam angle is small and electric power necessary for transmitting the broadcast control channel information is approximately as high as that of a conventional base station, the area covered by the base station 1 is larger than that of a conventional base station.

(Modification 1)

The calculation unit 1j of the base station 1 may calculate a beam rotation angular velocity-related condition based on the calculated beam rotation angular velocity-related condition and the condition that the beam rotation angular velocity is the value obtained by dividing the maximum rotation angular velocity by n (n is an integer equal to or larger than one). For example, the calculation unit 1j may calculate, as a rotation angular velocity-related condition, such a condition that the previously described expression (3) and the expression $\omega = \omega max/n$ are simultaneously satisfied.

This modification also has the advantages of the embodiment. Moreover, in this modification, the receiving unit 2b can receive an integer number of whole blocks. Accordingly, for example, even in such a case where the receiving unit 2b always performs a receiving operation, there is no need to receive data of a partial block (e.g., a half of one block or the like).

(Modification 2)

The previously described embodiment, the beam angle is predetermined. The present invention can be adopted in the case where the beam angle is not predetermined. In this case, the calculation unit $1j$ calculates conditions relating to the beam angle and the rotation angular velocity. In the case where the beam angle and the rotation angular velocity have been decided based on these conditions, the beam control unit $1k$ can even control the first directional antenna $1b$ such that a beam having the decided beam angle is rotated at the decided rotation angular velocity.

Hereinafter, a description for the same constitution and the same functions as those of the embodiment will be omitted, and the different points will be described below. First, as described in the embodiment, the calculation unit $1j$ performs the first and second calculation processes. Then, the calculation unit $1j$ calculates conditions relating to the rotation angular velocity and the beam angle which are necessary for enabling the receiving terminal 2 to receive all the blocks of the broadcast control channel information, based on the calculated rotation angular velocity-related condition and the condition that the rotation angular velocity is equal to or less than the maximum rotation angular velocity.

It is assumed that, for example, the expression (3) is calculated as the calculated rotation angular velocity-related condition. On the other hand, the condition that the rotation angular velocity is equal to or less than the maximum rotation angular velocity is represented by the following expression (5).

$$\omega \leq \omega max = Wa/d \text{ (deg/sec)} \quad (5)$$

Accordingly, such conditions that the rotation angular velocity ω and the beam angle Wa satisfy the expressions (3) and (5) can be said to be conditions relating to the rotation angular velocity and the beam angle which are necessary for enabling the receiving terminal 2 to receive all the blocks of the broadcast control channel information.

Then, the display unit displays the calculated conditions relating to the rotation angular velocity and the beam angle. Based on the conditions displayed on the display unit, for example, the administrator of the wireless communication system decides the rotation angular velocity and the beam angle.

Then, the administrator inputs the decided rotation angular velocity and beam angle using the input unit $1h$. The inputted rotation angular velocity and beam angle are transmitted to the beam control unit $1k$. In the case where the beam angle and the rotation angular velocity have been decided based on the beam rotation angular velocity-related condition and the condition that the rotation angular velocity is equal to or less than the maximum rotation angular velocity, the beam control unit $1k$ controls the first directional antenna $1b$ such that a beam having the decided beam angle is rotated at the decided rotation angular velocity.

A concrete description is as follows. The beam control unit $1k$ holds beam angle correspondence information which indicates the correspondence relationship between the beam angle and the number (hereinafter referred to as the number of antennas) of the second directional antennas $1d$ simultaneously transmitting beams. Then, the beam control unit $1k$ refers to the beam angle correspondence information to obtain the number of antennas which corresponds to the inputted beam angle.

Next, the beam control unit $1k$ selects the obtained number of second directional antennas $1d$ from among the plurality of second directional antennas $1d$. For example, in the case where each second directional antenna $1d$ is located at nth position (n is an integer equal to or larger than one) and where the number of antennas is three, the beam control unit $1k$ selects the second directional antennas $1d$ located at the first, second, and third positions.

The beam control unit $1k$ transmits the broadcast control channel information outputted by the first transmission amplifier unit $1g$ to the selected second directional antennas $1d$, and causes the selected second directional antennas $1d$ to transmit beams containing the broadcast control channel information. Then, the beam control unit $1k$ sequentially switches the selected second directional antennas $1d$ to other second directional antennas $1d$ at an antenna switching speed corresponding to the decided rotation angular velocity. Thus, the beam control unit $1k$ rotates the beams at the decided rotation angular velocity. The other functions of the beam control unit $1k$ than described above are the same as those in the embodiment.

Other functions than described above are the same as those of each unit in the wireless communication system of the embodiment. In the present modification, the same advantages as those of the embodiment can be obtained.

(Modification 3)

In the embodiment, the total block number, the block unit time, the coverage angle, and the beam angle are predetermined. In this modification, a description will be made for the case where the rotation angular velocity is predetermined instead of the beam angle. In this case, the calculation unit $1j$ can calculate a beam angle-related condition which is necessary for enabling the receiving terminal 2 to receive all the blocks of the broadcast control channel information.

Hereinafter, a description for the same functions as those of the embodiment and modification 2 will be omitted, and the different points will be described below. First, as described in the embodiment, the calculation unit $1j$ performs the first and second calculation processes.

Instead of the beam angle, the rotation angular velocity is inputted into the input unit $1h$. The inputted rotation angular velocity is transmitted to the calculation unit $1j$. The calculation unit $1j$ calculates a rotation angular velocity-related condition as previously described. Based on the above-described condition and the inputted rotation angular velocity, the calculation unit $1j$ calculates condition 1 (beam angle-related condition). Moreover, the calculation unit $1j$ calculates condition 2 (beam angle-related condition) based on the condition that the rotation angular velocity is equal to or less than the maximum rotation angular velocity (value obtained by dividing the beam angle by the block unit time), the inputted rotation angular velocity, and the block unit time. The calculation unit $1j$ calculates a beam angle-related condition which is necessary for enabling the receiving terminal 2 to receive all the blocks of the broadcast control channel information, based on calculated conditions 1 and 2. Then, for example, the administrator decides the beam angle based on the beam angle-related condition.

In the case where the beam angle has been decided based on the beam rotation angular velocity-related condition and the condition that the rotation angular velocity is equal to or less than the maximum rotation angular velocity, the beam control unit $1k$ controls the first directional antenna $1b$ such that a beam having the decided beam angle is rotated.

The operation in which the beam control unit $1k$ causes the first directional antenna $1b$ to rotate a beam having the decided beam angle at the predetermined rotation angular velocity is the same as that of modification 2. In this modification, the same advantages as those of the embodiment can be obtained.

(Modification 4)

In the embodiment and each modification, the calculation unit 1j may be disposed outside the base station 1. Moreover, the administrator may input the decided rotation angular velocity and beam angle using the input unit 1h. The inputted information including the rotation angular velocity is transmitted to the beam control unit 1k.

(Modification 5)

In the previously described embodiment and modification 4, the values predetermined in the design of the wireless communication system are inputted into the input unit 1h. In this modification, the base station 1 is not provided with an input unit 1h. Moreover, the calculation unit 1j holds the predetermined values. The calculation unit 1j calculates conditions which are necessary for enabling the receiving terminal 2 to receive all the blocks of the broadcast control channel based on the held values.

(Modification 6)

In this modification, the process of calculating the reception-not-ready timing can be modified as follows.

The calculation unit 2d of the receiving terminal 2 is already keeping the reception period Tp, the transmission block number α, the reception block number N, the total block number B, and the block unit time d. The time measuring unit 2c measures time t0 when the receiving unit 2b first begins receiving the broadcast control channel information, and then transmits time t0 to the calculation unit 2d.

The calculation unit 2d calculates the reception-not-ready timing based on each piece of held information and each piece of transmitted information. A concrete description will be made using FIG. 15. Upon obtaining above-described time t0, the calculation unit 2d calculates time t1 when the receiving unit 2b first terminates the reception of the broadcast control channel information, based on time t0, the reception block number N (N is two in FIG. 15), and the block unit time d. Then, the calculation unit 2d calculates the timing (time period from time t1 to time t2) when the receiving unit 2b cannot receive a block of the broadcast control channel information during the reception period, based on time t1 and the reception period Tp.

Subsequently, the calculation unit 2d calculates the reception-not-ready timing (timing when the receiving unit 2b cannot receive a block of the broadcast control channel information) based on the above-described timing (time period from time t1 to time t2) and the reception period Tp. The control unit 2g controls the receiving unit 2b so as not to perform a receiving operation during the reception-not-ready timing.

Incidentally, the control unit 2g of the receiving terminal 2 can first decode the SFN to determine which block is transmitted. Accordingly, it is also possible to calculate the reception timing of the broadcast control channel information which is intermittently transmitted, using the SFN. The calculation unit 2d may calculate the reception-not-ready timing using the calculated reception timing.

(Modification 7)

The previously described embodiment may also be modified as follows. When the receiving terminal 2 remains stationary, the receiving terminal 2 may be capable of receiving all the blocks of the broadcast control channel information in the time period between the time when a beam hits the receiving terminal 2 and the time when the beam deviates from the receiving terminal 2. In this case, the beam rotation angular velocity is required to satisfy the following relationship.

When the time needed by the first directional antenna to transmit all the blocks is A [sec] (e.g., 1280 msec), the beam rotation angular velocity is equal to or less than Wa (beam angle)/A (deg/sec).

In this modification, the beam angle and the time needed by the first directional antenna to transmit all the blocks are inputted into the input unit 1h. The calculation unit 1j calculates the condition that the rotation angular velocity is equal to or less than Wa (beam angle)/A (deg/sec), as a condition necessary for enabling the receiving terminal 2 to receive all the blocks.

Various modifications will become possible for those skilled in the art after receiving the teachings of the present disclosure without departing from the scope thereof.

What is claimed is:

1. A wireless communication method for transmitting broadcast control channel information having a plurality of blocks to a receiving terminal existing in a coverage area of a first directional antenna of a base station by rotation of a beam transmitted from the first directional antenna, the wireless communication method comprising the steps of:

calculating a transmission block number-related condition necessary for enabling the receiving terminal to receive all the blocks of the broadcast control channel information, based on the total number of the blocks of the broadcast control channel information and a transmission block number, the transmission block number indicating the number of blocks of the broadcast control channel information which are transmitted by the first directional antenna during a reception period, the reception period indicating an interval between the time points when the receiving terminal receives the broadcast control channel information;

calculating a beam rotation angular velocity-related condition based on the transmission block number-related condition, a block unit time, and a coverage angle, the block unit time indicating a time period needed by the first directional antenna to transmit one block of the broadcast control channel information, the coverage angle indicating an angle between two boundary lines of the coverage area; and controlling the first directional antenna to rotate the beam at a rotation angular velocity decided based on the beam rotation angular velocity-related condition.

2. A base station for transmitting broadcast control channel information having a plurality of blocks to a receiving terminal existing in a coverage area of a first directional antenna by rotation of a beam transmitted from the first directional antenna, the base station comprising:

a controller for controlling the first directional antenna to rotate the beam at a rotation angular velocity decided based on a beam rotation angular velocity-related condition in the case where a transmission block number-related condition necessary for enabling the receiving terminal to receive all the blocks of the broadcast control channel information has been calculated based on the total number of the blocks of the broadcast control channel information and a transmission block number, the transmission block number indicating the number of blocks of the broadcast control channel information transmitted by the first directional antenna during a reception period, the reception period indicating an interval between the time points when the receiving terminal receives the broadcast control channel information; the beam rotation angular velocity-related condition having been calculated based on the transmission block number-related condition, a block unit time, and a coverage angle, the block unit time indicating a time period needed by the first directional antenna to transmit one block of the broadcast control channel information, the coverage angle indicating an angle between two boundary lines of the coverage area.

3. The base station according to claim 2,
wherein the beam rotation angular velocity-related condition is calculated to allow the rotation angular velocity of the beam to be equal to or less than a maximum rotation angular velocity obtained by dividing a beam angle by the block unit time.

4. The base station according to claim 3,
wherein the transmission block number-related condition is calculated based on a condition in which a value obtained by multiplying first and second values together is equal to or larger than the total number of the blocks, the first value being obtained by dividing a least common multiple of the total number of blocks and the transmission block number by the transmission block number, the second value being a reception block number indicating the number of blocks of the broadcast control channel information which are received by the receiving terminal during the reception period, and the beam rotation angular velocity-related condition is calculated based on the transmission block number-related condition, the block unit time, the coverage angle, and a reception block number-related condition being calculated based on the rotation angular velocity and the maximum rotation angular velocity.

5. The base station according to claim 2,
wherein the first directional antenna includes a plurality of second directional antennas,
wherein the controller rotates the beam by sequentially switching the second directional antenna which transmits the beam containing the broadcast control channel information, to another second directional antenna along a predetermined direction, and
wherein, after the controller causes the second directional antenna having a beam transmission direction along one boundary line of the coverage area to transmit the beam, the controller causes the second directional antenna having a beam transmission direction along the other boundary line of the coverage area to transmit the beam.

6. A base station for transmitting broadcast control channel information having a plurality of blocks to a receiving terminal existing in a coverage area of a first directional antenna by rotation of a beam transmitted from the first directional antenna, the base station comprising:
a controller for controlling the first directional antenna to rotate the beam having a decided beam angle at a decided rotation angular velocity in the case where a transmission block number-related condition necessary for enabling the receiving terminal to receive all the blocks of the broadcast control channel information has been calculated based on the total number of the blocks of the broadcast control channel information and a transmission block number, the transmission block number indicating the number of blocks of the broadcast control channel information transmitted by the first directional antenna during a reception period, the reception period indicating an interval between the time points when the receiving terminal receives the broadcast control channel information; a beam rotation angular velocity-related condition having been calculated based on the transmission block number-related condition, a block unit time, and a coverage angle, the block unit time indicating a time period needed by the first directional antenna to transmit one block of the broadcast control channel information, the coverage angle indicating an angle between two boundary lines of the coverage area; the beam angle and the rotation angular velocity having been decided based on the beam rotation angular velocity-related condition and a condition that the rotation angular velocity of the beam is equal to or less than a maximum rotation angular velocity obtained by dividing a beam angle by the block unit time.

7. A base station for transmitting broadcast control channel information having a plurality of blocks to a receiving terminal existing in a coverage area of a first directional antenna by rotation of a beam transmitted from the first directional antenna, the base station comprising:
a controller for controlling the first directional antenna to rotate the beam having a decided beam angle in the case where a transmission block number-related condition necessary for enabling the receiving terminal to receive all the blocks of the broadcast control channel information has been calculated based on the total number of the blocks of the broadcast control channel information and a transmission block number, the transmission block number indicating the number of blocks of the broadcast control channel information transmitted by the first directional antenna during a reception period, the reception period indicating an interval between the time points when the receiving terminal receives the broadcast control channel information; a beam rotation angular velocity-related condition having been calculated based on the transmission block number-related condition, a block unit time, and a coverage angle, the block unit time indicating a time period needed by the first directional antenna to transmit one block of the broadcast control channel information, the coverage angle indicating an angle between two boundary lines of the coverage area; the beam angle having been decided based on the beam rotation angular velocity-related condition and a condition that the rotation angular velocity of the beam is equal to or less than a maximum rotation angular velocity obtained by dividing a beam angle by the block unit time.

* * * * *